United States Patent
Noh et al.

(10) Patent No.: US 11,405,908 B2
(45) Date of Patent: Aug. 2, 2022

(54) METHOD AND APPARATUS FOR CONTROL CHANNEL RECEPTION IN WIRELESS COMMUNICATION SYSTEMS

(71) Applicant: Samsung Electronics Co., Ltd., Suwon-si (KR)

(72) Inventors: Hoondong Noh, Suwon-si (KR); Taehyoung Kim, Suwon-si (KR); Hyoungju Ji, Suwon-si (KR); Jinhyun Park, Suwon-si (KR); Heecheol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 16/827,319

(22) Filed: Mar. 23, 2020

(65) Prior Publication Data
US 2020/0305134 A1 Sep. 24, 2020

(30) Foreign Application Priority Data

Mar. 22, 2019 (KR) .......................... 10-2019-0032969
Jun. 19, 2019 (KR) .......................... 10-2019-0073142

(51) Int. Cl.
*H04W 72/04* (2009.01)

(52) U.S. Cl.
CPC ................................. *H04W 72/042* (2013.01)

(58) Field of Classification Search
CPC ............... H04W 72/04; H04W 72/042; H04W 72/0446; H04W 72/1273; H04W 72/0493
See application file for complete search history.

(56) References Cited

U.S. PATENT DOCUMENTS

| 2018/0227156 | A1  | 8/2018  | Papasakellariou |
| 2018/0337752 | A1  | 11/2018 | Choi et al. |
| 2020/0154467 | A1* | 5/2020  | Gong ................. H04W 72/1273 |
| 2020/0221432 | A1* | 7/2020  | Park ..................... H04L 1/1896 |

(Continued)

FOREIGN PATENT DOCUMENTS

WO       2016111582 A1    7/2016

OTHER PUBLICATIONS

Intel Corporation, "Discussion on NR MIMO maintenance work," RP-190197, 3GPP TSG RAN Meeting #83, Shenzhen, China, Mar. 18-21, 2019, 4 pages.

(Continued)

*Primary Examiner* — Chi Ho A Lee
*Assistant Examiner* — Andrew Lee

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure discloses a signaling method and apparatus for properly increasing a control channel detection complexity of a terminal in order to efficiently detect a control channel for performing coordinated transmission such as non-coherent joint transmission (NC-JT).

24 Claims, 16 Drawing Sheets

(56) References Cited

U.S. PATENT DOCUMENTS

| | | | |
|---|---|---|---|
| 2020/0367160 A1* | 11/2020 | Braun | H04W 72/0493 |
| 2020/0368288 A1* | 11/2020 | Tomer | A61K 35/30 |
| 2020/0396686 A1* | 12/2020 | Tiirola | H04W 72/1273 |
| 2020/0404669 A1* | 12/2020 | Seo | H04W 76/27 |
| 2021/0058189 A1* | 2/2021 | Xiao | H04L 1/0038 |
| 2021/0067268 A1* | 3/2021 | Seo | H04W 72/0446 |
| 2021/0144746 A1* | 5/2021 | Ji | H04W 72/042 |
| 2021/0259003 A1* | 8/2021 | Hang | H04W 72/1273 |
| 2021/0314955 A1* | 10/2021 | Zhang | H04L 5/001 |

OTHER PUBLICATIONS

3GPP TS 38.213 V15.4.0 (Dec. 2018), Technical Specification, 3rd Generation Partnership Project; Technical Specification Group Radio Access Network; NR; Physical layer procedures for control (Release 15), 104 pages.

NTT Docomo, Inc., "Offline summary for PDCCH structure and search space", 3GPP TSG RAN WG1 Meeting #95, Nov. 12-16, 2018, R1-1813933, 94 pages.

Huawei, "Summary of 7.2.6.1.1 Potential enhancements to PDCCH", 3GPP TSG RAN WG1 Meeting #96, Feb. 25-Mar. 1, 2019, R1-1903349, 37 pages.

Ericsson, "Correction on PDCCH monitoring with pdcch-BlindDetectionCA", Draft Change Request, 3GPP TSG-RAN WG1 Meeting #96, Feb. 25-Mar. 1, 2019, R1-1901854, 11 pages.

ZTE, "Additional considerations on beam management for multi-TRP", 3GPP TSG RAN WG1 #96, Feb. 25-Mar. 1, 2019, R1-1901639, 6 pages.

International Search Report dated Jun. 29, 2020 in connection with International Patent Application No. PCT/KR2020/003937, 3 pages.

Written Opinion of the International Searching Authority dated Jun. 29, 2020 in connection with International Patent Application No. PCT/KR2020/003937, 6 pages.

European Patent Office, "Supplementary European Search Report" dated Dec. 7, 2021, in connection with European Patent Application No. 20777189.0, 7 pages.

Vivo, "Remaining details on NR-PDCCH search space", R1-1719781, 3GPP TSG RAN WG1 Meeting 91, Reno, USA, Nov. 27-Dec. 1, 2017, 7 pages.

NTT Docomo Inc., "Draft CR on 38.213 regarding number of BDs and CCEs for DL BWP", R1-1813301, Spokane, USA, Nov. 12-16, 2018, 3 pages.

* cited by examiner

FIG. 9A
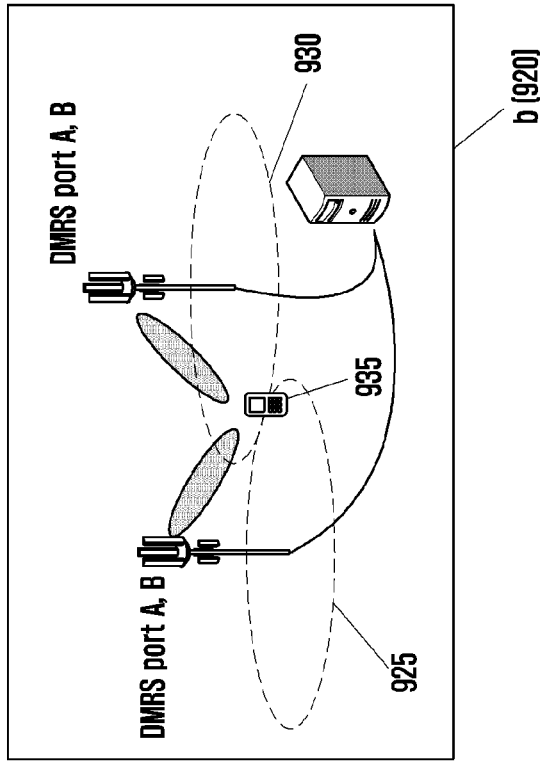
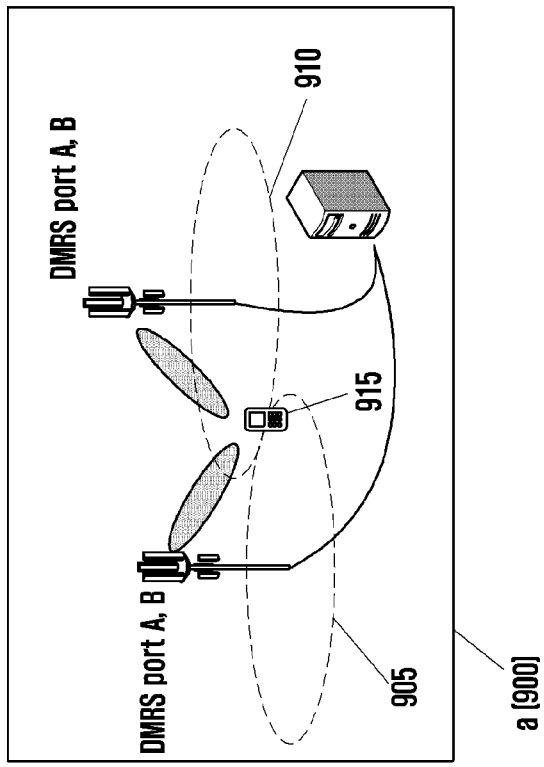

METHOD AND APPARATUS FOR CONTROL CHANNEL RECEPTION IN WIRELESS COMMUNICATION SYSTEMS

CROSS-REFERENCE TO RELATED APPLICATIONS

This application is based on and claims priority under 35 U.S.C. § 119 to Korean Patent Application Nos. 10-2019-0032969 and 10-2019-0073142 filed on Mar. 22, 2019 and Jun. 19, 2019, respectively, in the Korean Intellectual Property Office, the disclosures of which are herein incorporated by reference in their entireties.

BACKGROUND

1. Field

The disclosure relates to a method and an apparatus for transmitting and receiving a downlink control channel in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In an LTE or NR system, a terminal performs blind decoding to receive a control channel (e.g., physical downlink control channel (PDCCH). Further, coordinated transmission may be performed for an efficient traffic transmission.

SUMMARY

The disclosure provides signaling methods for properly increasing a control channel detection complexity of a terminal to match coordinated communication transmission conditions.

The present disclosure has been made to address the above-mentioned problems and disadvantages, and to provide at least the advantages described below.

In accordance with an aspect of the present disclosure, A method performed by a terminal in a communication system is provided. The method includes identifying a first number of cells corresponding to a capability to monitor physical downlink control channel (PDCCH) candidates based on a control resource set (CORESET) group identifier configured to each cell; determining a maximum number of PDCCH candidates based on the first number of cells; identifying search spaces to monitor based on the maximum number of PDCCH candidates; and monitoring a PDCCH on the identified search space.

In accordance with another aspect of the present disclosure, a method performed by a base station in a communication system is provided. The method includes identifying a first number of cells corresponding to a capability to monitor physical downlink control channel (PDCCH) candidates of a terminal based on a control resource set (CORESET) group identifier configured to each cell; determining a maximum number of PDCCH candidates based on the first number of cells; identifying search spaces to be monitored by the terminal based on the maximum number of PDCCH candidates; and transmitting downlink control information on the identified search space of a PDCCH.

In accordance with another aspect of the present disclosure, a terminal in a communication system is provided. The terminal includes a transceiver and a controller coupled with the transceiver and configured to identify a first number of cells corresponding to a capability to monitor physical downlink control channel (PDCCH) candidates based on a control resource set (CORESET) group identifier configured to each cell, determine a maximum number of PDCCH candidates based on the first number of cells, identify search spaces to monitor based on the maximum number of PDCCH candidates, and perform monitoring a PDCCH on the identified search space.

In accordance with another aspect of the present disclosure, a base station in a communication system is provided. The base station includes a transceiver and a controller coupled with the transceiver and configured to identify a first number of cells corresponding to a capability to monitor physical downlink control channel (PDCCH) candidates of a terminal based on a control resource set (CORESET) group identifier configured to each cell, determine a maximum number of PDCCH candidates based on the first number of cells, identify search spaces to be monitored by the terminal based on the maximum number of PDCCH candidates, and transmit downlink control information on the identified search space of a PDCCH.

Through a method for determining restrictions on the maximum number of PDCCH candidates and the maximum number of CCEs proposed in the disclosure, transmission and reception of PDCCHs can be performed more efficiently in an environment in which coordinated communication transmission, such as NC-JT, and a CA are simultaneously supported, and thus scheduling flexibility can be heightened.

Effects that can be obtained in the disclosure are not limited to the above-described effects, and other unmentioned effects can be clearly understood by those of ordinary skill in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 9A illustrates a diagram of a joint transmission (JT) technique according to an embodiment of the disclosure.

DETAILED DESCRIPTION

Figure 1:
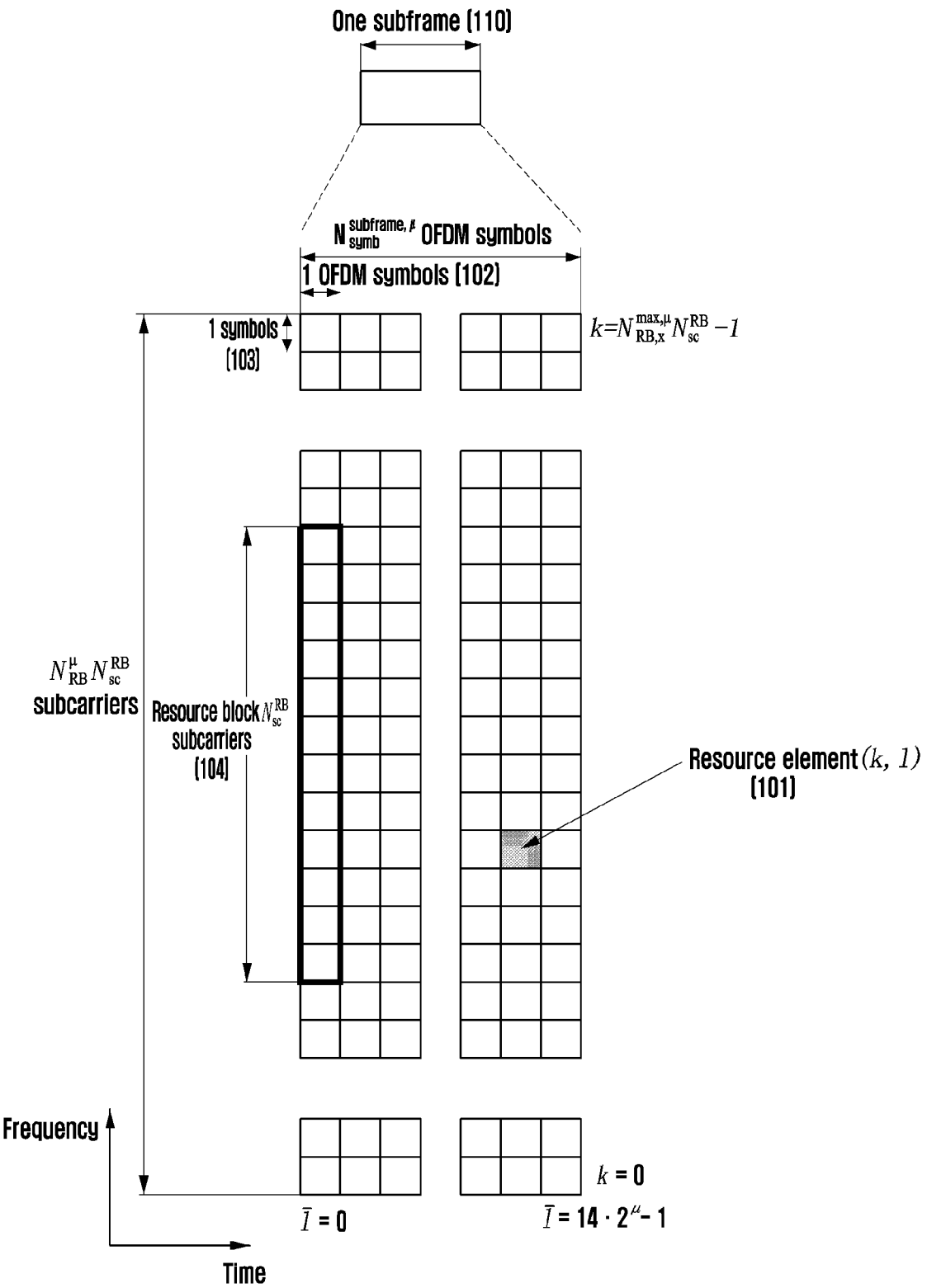
FIG. 1 illustrates a diagram of the basic structure of a time-frequency domain in 5G.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In explaining the embodiments, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as field programmable gate array (FPGA) or application specific integrated circuit (ASIC), which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card. Further, in some embodiments, "unit" may include one or more processors.

Hereinafter, the operational principle of the disclosure will be described in detail with reference to the accompanying drawings. In describing the disclosure, a detailed description of related known functions or configurations will be omitted if it is determined that it obscures the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

Hereinafter, embodiments of the disclosure will be described in detail with reference to the accompanying drawings. Although embodiments of the disclosure are described hereinafter in a state where a 5G system is exemplified, the embodiments of the disclosure can also be applied even to other communication systems having similar technical backgrounds or channel types. For example, LTE or LTE-A mobile communication and mobile communication technology being developed after 5G may be included therein. Accordingly, the embodiments of the disclosure can also be applied to other communication systems through partial modifications thereof within a range that does not greatly deviate from the scope of the disclosure by the judgment of those skilled in the art.

Further, in describing the disclosure, a detailed description of related functions or configurations will be omitted if it is determined that it obscures the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

A wireless communication system was initially developed for the purpose of providing a voice-oriented service, but it has been expanded to, for example, a broadband wireless communication system that provides a high-speed and high-quality packet data service like the communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e.

In an LTE system that is a representative example of broadband wireless communication systems, a downlink (DL) adopts an orthogonal frequency division multiplexing (OFDM) scheme, and an uplink (UL) adopts single carrier frequency division multiple access (SC-FDMA) scheme. The uplink means a radio link in which a terminal (or user equipment (UE)) or a mobile station (MS) transmits data or a control signal to a base station (BS) (or eNode B), and the downlink means a radio link in which the base station transmits data or a control signal to the terminal. According to the above-described multiple access schemes, data of respective users or control information can be discriminated from each other by assigning and operating time-frequency resources for carrying the data or the control information so as to prevent the time-frequency resources from overlapping each other, that is, to establish orthogonality.

As the post LTE communication system, the 5G communication system should support services that simultaneously satisfy various requirements of users and service providers because the 5G communication system is required to freely reflect the various requirements. Services being considered for the 5G communication system may include enhanced mobile broadband (eMBB), massive machine type communication (mMTC), and ultra-reliability low-latency communication (URLLC).

The eMBB aims to provide a more improved data rate than the data rate supported by the existing LTE, LTE-A, or LTE-Pro. For example, in the 5G communication system, from the viewpoint of one base station, the eMBB should provide the peak data rate of 20 Gbps in the downlink and the peak data rate of 10 Gbps in the uplink. Further, the 5G communication system should provide the peak data rate and an increased user perceived data rate of the terminal. To satisfy such requirements, it is required to improve various transmission/reception technologies including more improved multi input multi output (MIMO) transmission technology. Further, the current LTE transmits signals using the maximum 20 MHz transmission bandwidth in the 2 GHz band, whereas the 5G communication system uses a wider frequency bandwidth than 20 MHz in the frequency band of 3 to 6 GHz or 6 GHz or more, and thus can satisfy the data rate required in the 5G communication system.

At the same time, the mMTC is under consideration to support application services, such as the Internet of things (IoT), in the 5G communication system. In order to efficiently provide the Internet of things, the mMTC requires massive terminal connection support in a cell, terminal coverage improvement, improved battery time, and terminal cost reduction. Because the Internet of things is attached to various kinds of sensors and devices to provide communication functions, it should support a large number of terminals (e.g., 1,000,000 terminals/km') in the cell. Further, because there is a high possibility that the terminal supporting the mMTC is located in a shaded area that the cell is unable to cover, such as underground of a building, due to the service characteristics, a wider coverage is required as compared with other services provided in the 5G communication system. The terminal supporting the mMTC should be inexpensive, and requires very long battery lifetime, such as 10 to 15 years, because it is difficult to frequently replace the battery of the terminal.

Last, the URLLC is a cellular based wireless communication service used for a specific purpose (mission-critical). For example, services used for remote control of a robot or machinery, industrial automation, unmanned aerial vehicle, remote health care, and emergency alert may be considered. Accordingly, it is required for the communication provided by the URLLC to provide very low latency and very high reliability. For example, a service supporting the URLLC should satisfy air interface latency that is shorter than 0.5 ms, and requires a packet error rate of $10^{-5}$ or less at the same time. Accordingly, for the service supporting the URLLC, the 5G system should provide a transmit time interval (TTI) that is smaller than that of other services, and also requires design requirements to assign wide resources in the frequency band in order to secure reliability of communication links.

The three kinds of 5G services, that is, the eMBB, URLLC, and mMTC, may be multiplexed and transmitted in one system. In this case, in order to satisfy different requirements of the respective services, different transmission/reception techniques and transmission/reception parameters may be used among the services.

Hereinafter, a frame structure of a 5G system will be described in more detail with reference to the drawings.

FIG. 1 illustrates a diagram of the basic structure of a time-frequency domain that is a radio resource region in which data or a control channel is transmitted in a 5G system.

With reference to FIG. 1, a horizontal axis represents a time domain, and a vertical axis represents a frequency domain. In the time and frequency domains, the basic unit of resources is a resource element (RE) 101, which may be defined as one orthogonal frequency division multiplexing (OFDM) symbol 102 on a time axis and as one subcarrier 103 on a frequency axis. In the frequency domain, (e.g., 12) successive REs may constitute one resource block (RB) 104.

Figure 2:
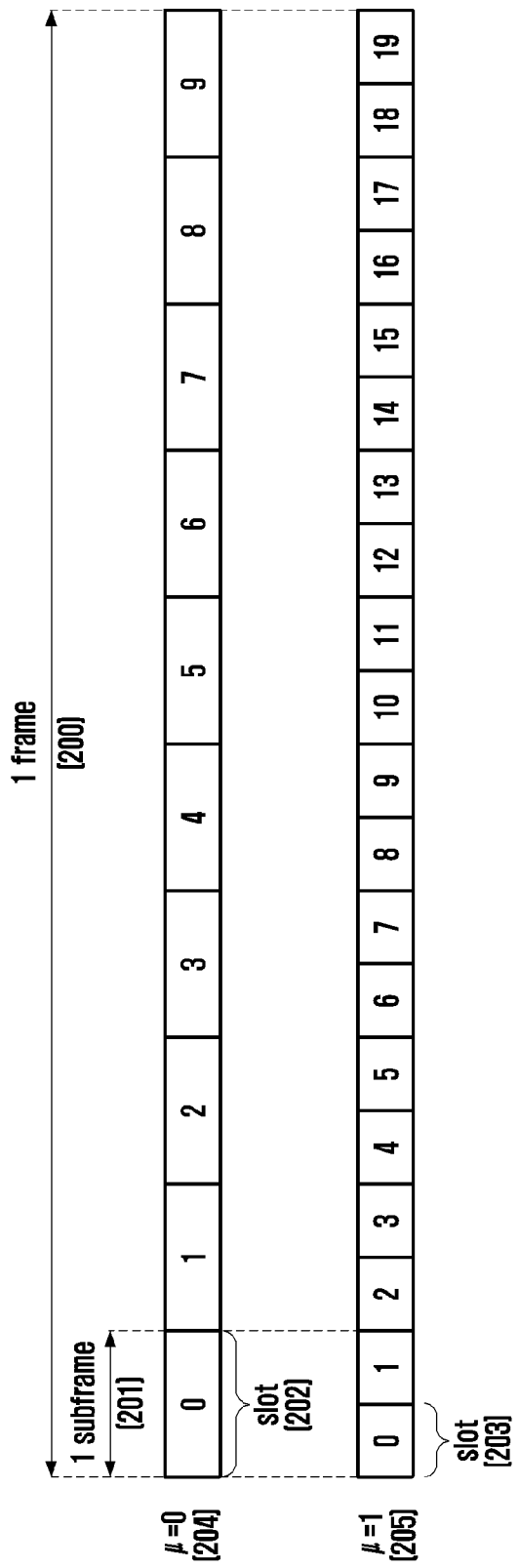
FIG. 2 illustrates a diagram of frame, subframe, and slot structures in 5G.

FIG. 2 illustrates a diagram of a slot structure that is considered in a 5G system.

FIG. 2 illustrates an example of structures of a frame 200, subframe 201, and slot 202. One frame 200 may be defined as 10 ms. One subframe 201 may be defined as 1 ms, and thus one frame 200 may be composed of 10 subframes 201 in total. One slot 202 or 203 may be defined as 14 OFDM symbols (i.e., the number of symbols $N_{symb}^{slot}$ for one slot=14). The subframe 201 may be composed of one or a plurality of slots 202 and 203, and the number of slots 202 and 203 for one subframe 201 may differ depending on a configuration value μ 204 or 205 for subcarrier spacing. In an example of FIG. 2, cases where the configuration value μ for the subcarrier spacing is μ=0 204 and μ=1 205 are illustrated. If μ=0 204, one subframe 201 may be composed of one slot 202, whereas if μ=1 205, one subframe 201 may be composed of two slots 203. That is, the number of slots $N_{slot}^{subframe,\mu}$ for one subframe may differ depending on the configuration value μ for the subcarrier spacing, and thus the number of slots $N_{slot}^{frame,\mu}$ for one frame may also differ. The numbers $N_{slot}^{subframe,\mu}$ and $N_{slot}^{frame,\mu}$ in accordance with the configuration value μ for each subcarrier spacing may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
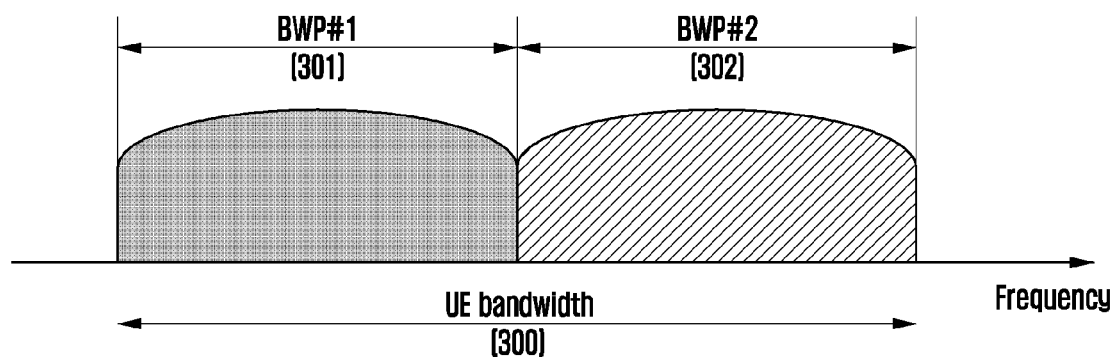
FIG. 3 illustrates a diagram of an example of bandwidth part configuration in 5G.

Next, bandwidth part (BWP) configuration in a 5G communication system will be described in detail with reference to the drawings. FIG. 3 illustrates a diagram of an example of bandwidth part configuration in a 5G communication system.

FIG. 3 shows an example in which a terminal (UE) bandwidth is configured to include two bandwidth parts, that is, bandwidth part #1 301 and bandwidth part #2 302. A base station may configure one or a plurality of bandwidth parts for the terminal, and may configure following information with respect to the respective bandwidth parts.

TABLE 2

```
BWP ::=              SEQUENCE {
   bwp-Id                BWP-Id,
   (Bandwidth part identifier)
   locationAndBandwidth  INTEGER (1..65536),
   (Location of bandwidth part)
   subcarrierSpacing     ENUMERATED {n0, n1, n2, n3, n4, n5},
   (Subcarrier spacing)
   cyclicPrefix          ENUMERATED { extended }
   (Cyclic prefix)
}
```

In addition to the configuration information as described above, various parameters related to the bandwidth parts may be configured for the terminal. The above-described information may be transferred from the base station to the terminal, for example, through higher layer signaling, for example, RRC signaling. One configured bandwidth part or at least one of a plurality of bandwidth parts may be activated. Whether to activate the configured bandwidth part may be semi-statically transferred from the base station to the terminal through RRC signaling, or may be dynamically transferred through DCI. The terminal before an RRC connection may be configured with an initial bandwidth part (BWP) for an initial connection from the base station through a master information block (MIB). More specifically, the terminal, at an initial connection stage, may receive configuration information on a control resource set (CORESET) capable of transmitting a PDCCH for receiving system information (which may correspond to remaining system information (RMSI) or system information block 1 (SIB1)) that is necessary for the initial connection and search spaces through the MIB. The control resource set and the search spaces configured through the MIB may be respectively considered as identity (ID) 0. The base station may notify the terminal of configuration information, such as frequency assignment information on a control resource set #0, time assignment information, and numerology, through the MIB. Further, the base station may notify the base station of configuration information on a monitoring period and occasion for the control resource set #0, that is, configuration information for a search space #0, through the MIB. The terminal may consider a frequency region configured as the control resource set #0 acquired from the MIB as the initial bandwidth part for the initial connection. In this case, an identity (ID) of the initial bandwidth part may be considered as 0.

The configuration of the bandwidth parts supported in the 5G may be used for various purposes.

As an example, if the bandwidth supported by the terminal is less than the system bandwidth, this may be supported through the bandwidth part configuration. For example, by configuring a frequency location (configuration information 2) of a bandwidth part at Table 2 as described above to the terminal, the terminal can transmit and receive data at a specific frequency location in the system bandwidth.

As another example, the base station may configure a plurality of bandwidth parts to the terminal for the purpose of supporting different numerologies. For example, in order for a certain terminal to support data transmission and reception using both a subcarrier spacing of 15 kHz and a subcarrier spacing of 30 kHz, two bandwidth parts may be configured as subcarrier spacing of 15 kHz and 30 kHz, respectively. The different bandwidth parts may be frequency-division-multiplexed, and in case of transmitting and receiving data with specific subcarrier spacing, the bandwidth part that is configured with the corresponding subcarrier spacing may be activated.

As another example, the base station may configure bandwidth parts having bandwidths of different sizes to the terminal for the purpose of reducing power consumption of the terminal. For example, if the terminal supports a very high bandwidth, for example, a bandwidth of 100 MHz, and it transmits and receives data always with the corresponding bandwidth, this may cause quite high power consumption. In particular, from the viewpoint of the power consumption, it is very inefficient to perform monitoring of unnecessary downlink control channels with the high bandwidth of 100 MHz in a situation that no traffic exists. For the purpose of reducing the power consumption of the terminal, the base station may configure a bandwidth part having a relatively low bandwidth, for example, a bandwidth part of 20 MHz, to the terminal. In the situation of no traffic, the terminal may perform a monitoring operation in the bandwidth part of 20 MHz, and in case of data occurrence, the terminal may transmit and receive data with the bandwidth part of 100 MHz in accordance with instructions of the base station.

In a method for configuring the bandwidth parts, terminals before being RRC-connected may receive configuration information of the initial bandwidth part through the master information block (MIB) at the initial connection stage. More specifically, the terminal may be configured with a control resource set (CORESET) for a downlink control channel capable of transmitting downlink control information (DCI) for scheduling a system information block (SIB) from the MIB of a physical broadcast channel (PBCH). The bandwidth of the control resource set configured through the MIB may be considered as the initial bandwidth part, and the terminal may receive a PDSCH on which the SIB is transmitted through the configured initial bandwidth part. In addition to the purpose of receiving the SIM, the initial bandwidth part may be utilized for other system information (OSI), paging, and random access.

Next, a synchronization signal (SS)/PBCH block in 5G will be described.

The SS/PBCH block means a physical layer channel block composed of a primary SS (PSS), a secondary SS (SSS), and a PBCH, and the details thereof are as follows.
- PSS: This is a reference signal of downlink time/frequency synchronization, and it provides partial information of a cell ID.
- SSS: This is a reference signal of downlink time/frequency synchronization, and it provides remaining cell ID information that is not provided by the PSS. In addition, the SSS may serve as a reference signal for demodulating the PBCH.
- PBCH: This provides essential system information necessary for transmission/reception of a data channel and a control channel of the terminal. The essential system information may include search space related control information indicating radio resource mapping information of the control channel and scheduling control information on a separate data channel for transmitting the system information.
- SS/PBCH block: An SS/PBCH block is composed of a combination of the PSS, SSS, and PBCH. One or a plurality of SS/PBCH blocks may be transmitted within a time of 5 ms, and the respective SS/PBCH blocks may be discriminated from each other by indexes.

At an initial connection stage, the terminal may detect the PSS and the SSS, and it may decode the PBCH. The terminal may acquire the MIB from the PBCH, and it may be configured with a control resource set #0 from the acquired MIB. The terminal may perform monitoring of the control resource set #0 under the assumption that the selected SS/PBCH block and a DMRS transmitted from the control resource set #0 are quasi co located (QCL) with each other. The terminal may receive the system information through the downlink control information transmitted from the control resource set #0. The terminal may acquire configuration information related to a random access channel (RACH) that is necessary for the initial connection from the received system information. The terminal may transmit a physical RACH (PRACH) to the base station in consideration of the SS/PBCH index selected by the terminal itself, and the base station having received the PRACH may acquire information on the SS/PBCH block index selected by the terminal from the received PRACH. Through this, the base station can be aware of the fact that which of the respective SS/PBCH blocks the terminal has selected and whether the terminal has monitored the control resource set #0 related to the selected block.

Next, downlink control information (DCI) in a 5G system will be described in detail.

In the 5G system, scheduling information on uplink data (or physical uplink shared channel (PUSCH)) or downlink data (or physical downlink shared channel (PDSCH)) is transferred from the base station to the terminal through the DCI. The terminal may monitor a fallback DCI format and a non-fallback DCI format with respect to the PUSCH or PDSCH. The fallback DCI format may include a fixed field predefined between the base station and the terminal, and the non-fallback DCT format may include a configurable field.

The DCI may be transmitted on a physical downlink control channel (PDCCH) through a channel coding and modulation process. A cyclic redundancy check (CRC) is attached to a DCI payload, and the CRC is scrambled by a radio network temporary identifier (RNTI) corresponding to the identity of the terminal. Different RNTIs are used in accordance with the purpose of a DCI message, for example, in accordance with a UE-specific data transmission, a power control command, or a random access response. That is, the RNTI is not transmitted explicitly, but is included in a CRC computation process to be transmitted. In case of receiving the DCI message being transmitted on the PDCCH, the terminal identifies the CRC using the assigned RNTI, and if the result of identifying the CRC is correct, the terminal can be aware that the corresponding message has transmitted to the terminal. Hereinafter, the PDCCH transmission may be interchangeably used with the DCI transmission on the PDCCH.

For example, the DCI scheduling the PDSCH on the system information (SI) may be scrambled by an SI-RNTI. The DCI scheduling the PDSCH on a random access response (RAR) message may be scrambled by a RA-RNTI. The DCI scheduling the PDSCH on a paging message may be scrambled by a P-RNTI. The DCI notifying a slot format indicator (SFI) may be scrambled by an SFI-RNTI. The DCI notifying a transmit power control (TPC) may be scrambled by a TPC-RNTI. The DCI scheduling the UE-specific PDSCH or PUSCH may be scrambled by a cell RNTI (C-RNTI).

DCI format 0_0 may be used as a fallback DCI scheduling the PUSCH, and in this case, the CRC may be scrambled by the C-RNTI. The DCI format 0_0 in which the CRC is scrambled by the C-RNTI may include, for example, the following information.

TABLE 3

Identifier for DCI formats-[1] bit
Frequency domain resource assignment-
$[\,[\,\log_2(N_{RB}^{UL,\,BWP}\,(N_{RB}^{UL,\,BWP} + 1)/2\,]\,]$ bits
Time domain resource assignment-4 bits
Frequency hopping flag-1 bit.
Modulation and coding scheme-5 bits
New data indicator-1 bit
Redundancy version-2 bits
HARQ process number-4 bits
Transmit power control (TPC) command for scheduled PUSCH-[2] bits
Uplink (UL)/supplementary UL (SUL) indicator-0 or 1 bit DCI format 0_1 may be used as a non-fallback DCI scheduling the PUSCH, and in this case, the CRC may be scrambled by the C-RNTI. The DCI format 0_1 in which the CRC is scrambled by the C-RNTI may include, for example, the following information.

TABLE 4

Carrier indicator-0 or 3 bits
UL/SUL indicator-0 or 1 bit
Identifier for DCI formats-[1] bits
Bandwidth part indicator-0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2 \rceil$ bits
  Time domain resource assignment-1, 2, 3, or 4 bits
  VRB-to-PRB mapping ((virtual resource block)-to-(physical resource block) mapping)-0 or 1 bit, only for resource allocation type 1.
  0 bit if only resource allocation type 0 is configured;
  1 bit otherwise.
    Frequency hopping flag-0 or 1 bit, only for resource allocation type 1.
  0 bit if only resource allocation type 0 is configured;
  1 bit otherwise.
    Modulation and coding scheme-5 bits
    New data indicator-1 bit
    Redundancy version-2 bits
    HARQ process number-4 bits
    1st downlink assignment index-1 or 2 bits TABLE 4-continued 1 bit for semi-static HARQ-ACK codebook(for semi-static HARQ-ACK codebook);
    2 bits for dynamic HARQ-ACK codebook with single HARQ-ACK codebook (in case that dynamic HARQ-ACK codebook is used together with single HARQ-ACK codebook).
    2nd downlink assignment index-0 or 2 bits
    2 bits for dynamic HARQ-ACK codebook with twHARQ-ACK sub-codebooks (in case that dynamic HARQ-ACK codebook is used together with two HARQ-ACK codebooks);
    0 bit otherwise.
    TPC command for scheduled PUSCH-2 bits $$\text{SRS resource indicator-} \left\lceil \log_2\left(\sum_{k=1}^{L_{max}} \binom{N_{SRS}}{k}\right) \right\rceil \text{ or } \lceil \log_2(N_{SRS}) \rceil \text{ bits}$$

$$\left\lceil \log_2\left(\sum_{k=1}^{L_{max}} \binom{N_{SRS}}{k}\right) \right\rceil \text{ bits for non-codebook based PUSCH transmission}$$

(in-case that PUSCH transmission is not based on codebook);
    $\lceil \log_2(N_{SRS}) \rceil$ bits for codebook based PUSCH transmission (in case that PUSCH transmission is based on codebook).
    Precoding information and number of layers-up to 6 bits
    Antenna ports-up to 5 bits
    SRS request-2 bits
    CSI request (channel state information request)-0, 1, 2, 3, 4, 5, or 6 bits
    CBG transmission information (code block group transmission information)-0, 2, 4, 6, or 8 bits
    PTRS-DMRS association ((phase tracking reference signal)-(demodulation reference signal) association)-0 or 2 bits.
    beta_offset indicator-0 or 2 bits
    DMRS sequence initialization (demodulation reference signal sequence initialization)-0 or 1 bit DCI format 1_0 may be used as a fallback DCI scheduling the PDSCH, and in this case, the CRC may be scrambled by the C-RNTI. The DCI format 1_0 in which the CRC is scrambled by the C-RNTI may include, for example, the following information.

TABLE 5

Identifier for DCI formats-[1] bit
Frequency domain resource assignment-
[ [ $\log_2(N_{RB}^{DL,\ BWP} (N_{RB}^{DL,\ BWP} + 1)/2)$ ] ] bits
Time domain resource assignment-4 bits
VRB-to-PRB mapping-1 bit
Modulation and coding scheme-5 bits
New data indicator-1 bit
Redundancy version-2 bits
HARQ process number-4 bits
Downlink assignment index-2 bits
TPC command for scheduled PUCCH-[2] bits
PUCCH resource indicator (physical uplink control channel (PUCCH) resource
indicator)-3 bits
PDSCH-to-HARQ feedback timing indicator-[3] bits DCI format 1_1 may be used as a non-fallback DCI scheduling the PDSCH, and in this case, the CRC may be scrambled by the C-RNTI. The DCI format 1_1 in which the CRC is scrambled by the C-RNTI may include, for example, the following information.

TABLE 6

Figure 4:
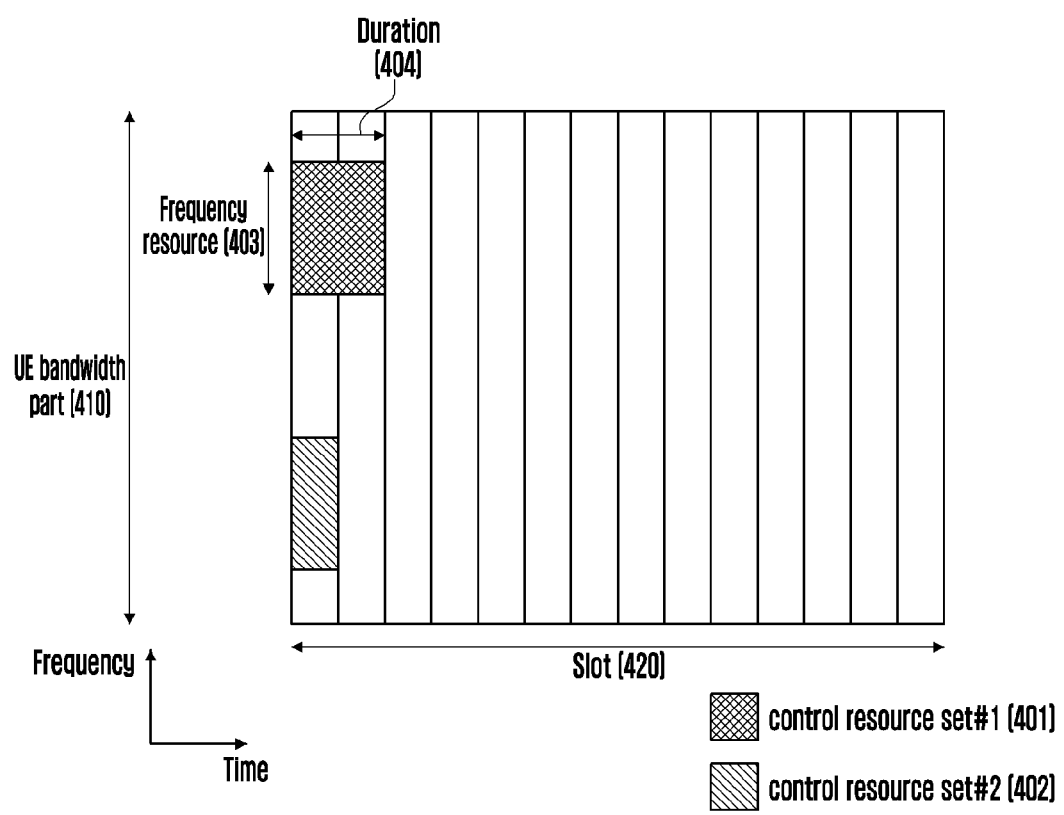
FIG. 4 illustrates a diagram of an example of a control resource set configuration of a downlink control channel in 5G.

Carrier indicator-0 or 3 bits
Identifier for DCI formats-[1] bits
Bandwidth part indicator-0, 1 or 2 bits
Frequency domain resource assignment
For resource allocation type 0, [ $N_{RB}^{DL,\ BWP}/P$ ] bits TABLE 6-continued For resource allocation type 1, [ $\log_2(N_{RB}^{DL, BWP}(N_{RB}^{DL, BWP} + 1)/2$ ] bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
PRB bundling size indicator (physical resource block bundling size indicator)-
0 or 1 bit
Rate matching indicator-0, 1, or 2 bits
ZP CSI-RS trigger (zero-power channel state information reference signal
trigger)-0, 1, or 2 bits
For transport block 1:
Modulation and coding scheme-5 bits
New data indicator-1 bit
Redundancy version-2 bits
For transport block 2:
Modulation and coding scheme-5 bits
New data indicator-1 bit
Redundancy version-2 bits
HARQ process number-4 bits
Downlink assignment index-0 or 2 or 4 bits
TPC command for scheduled PUCCH-2 bits
PUCCH resource indicator-3 bits
PDSCH-to-HARQ_feedback timing indicator-3 bits
Antenna ports-4, 5 or 6 bits
Transmission configuration indication (TCI)-0 or 3 bits
SRS request-2 bits
CBG transmission information-0, 2, 4, 6, or 8 bits
CBG flushing out information (code block group flushing out information)-0
or 1 bit
DMRS sequence initialization-1 bit Hereinafter, a downlink control channel in a 5G communication system will be described in more detail with reference to the drawing. FIG. 4 illustrates a diagram of an example of a control resource set (CORESET) for transmitting a downlink control channel in a 5G wireless communication system. FIG. 4 shows an example in which a bandwidth part 410 of a terminal (UE) is configured on a frequency axis, and two control resource sets (control resource set #1 401 and control resource set #2 402) are configured in one slot 420 on a time axis. The control resource sets 401 and 402 may be configured to a specific frequency resource 403 in the whole UE bandwidth part 410 on the frequency axis. On the time axis, one or a plurality of OFDM symbols may be configured, and this may be defined as a control resource set duration 404. In the example of FIG. 4, the control resource set #1 401 is configured with a control resource set duration of two symbols, and the control resource set #2 is configured with a control resource set duration of one symbol.

The control resource set in the 5G as described above may be configured from the base station to the terminal through higher layer signaling (e.g., system information, master information block (MIB), and radio resource control (RRC) signaling). Configuration of the control resource set to the terminal means providing of information, such as a control resource set identity, a frequency location of the control resource set, and a control resource set symbol duration. For example, the control resource set may include the following information.

TABLE 7

ControlResourceSet ::=             SEQUENCE {
    -- Corresponds to L1 parameter 'CORESET-ID'
    controlResourceSetId           ControlResourceSetId,
    (Control resource set Identity)
    frequencyDomainResources       BIT STRING (SIZE (45)),
    (Frequency axis resource assignment information)
    duration                       INTEGER (1..maxCoReSetDuration),
    (Time axis resource assignment information)
    cce-REG-MappingType            CHOICE {
    (CCE-to-REG mapping type)
        interleaved                SEQUENCE {
            reg-BundleSize         ENUMERATED {n2, n3, n6},
            (REG bundle size)
            precoderGranularity    ENUMERATED
{sameAsREG-bundle, allContiguousRBs},
            interleaverSize        ENUMERATED {n2, n3, n6}
            (Interleaver size)
            shiftIndex
INTEGER(0..maxNrofPhysicalResourceBlocks-1)
OPTIONAL
            (Interleaver Shift)
        },
        nonInterleaved             NULL
    },
    tci-StatesPDCCH                SEQUENCE(SIZE    (1..maxNrofTCI- TABLE 7-continued

```
StatesPDCCH)) OF TCI-StateId          OPTIONAL,
   (QCL configuration information)
   tci-PresentInDCI                   ENUMERATED {enabled}
                                      OPTIONAL,  -- Need S
}
```

Figure 5:
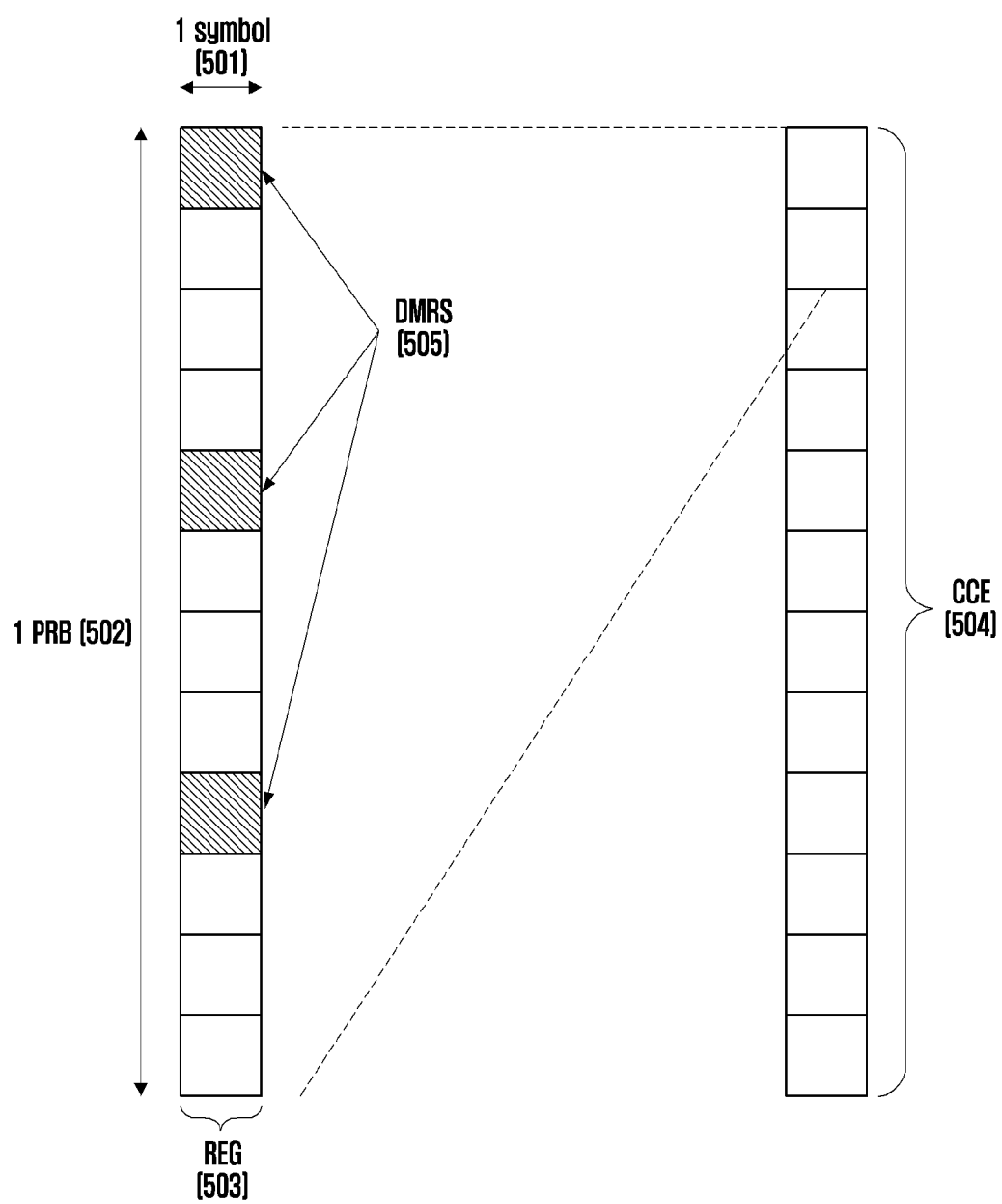
FIG. 5 illustrates a diagram of the structure of a downlink control channel in 5G.

At Table 7, tci-StatesPDCCH (simply called "TCI state") configuration information may include information on one or a plurality of synchronization signal (SS)/physical broadcast channel (PBCH) block indexes that are in quasi co located (QCL) relations with the DMRS transmitted from the corresponding control resource set or channel state information reference signal (CSI-RS) indexes. FIG. 5 illustrates a diagram of an example of a base unit of time and frequency resources configuring a downlink control channel that can be used in 5G. With reference to FIG. 5, the base unit of the time and frequency resources configuring the control channel is called a resource element group (REG) 503, and the REG 503 may be defined as one OFDM symbol 501 on a time axis and one physical resource block 502 on a frequency axis, that is, 12 subcarriers. A downlink control channel assignment unit may be configured through concatenation of the REG 503.

As illustrated in FIG. 5, if the base unit for assigning the downlink control channel in the 5G is a control channel element (CCE) 504, one CCE 504 may be composed of a plurality of REGs 503. With reference to the REG 503 illustrated in FIG. 5 as an example, the REG 503 may be composed of 12 REs, and if one CCE 504 is composed of 6 REGs 503, it may mean that one CCE 504 is composed of 72 REs. If a downlink control resource set is configured, the corresponding resource set may be composed of a plurality of CCEs 504, and a specific downlink control channel may be mapped onto one or a plurality of CCEs 504 to be transmitted in accordance with an aggregation level (AL) in the control resource set. The CCEs 504 in the control resource set may be discriminated by numbers, and in this case, the numbers may be assigned in accordance with a logical mapping method.

The base unit of the downlink control channel illustrated in FIG. 5, that is, the REG 503, may include all of REs onto which the DCI is mapped and a resource set onto which a DMRS 505 that is a reference signal for decoding the REs is mapped. As illustrated in FIG. 5, three DMRSs 505 may be transmitted in one REG 503.

The number of CCEs necessary to transmit the PDCCH may be 1, 2, 4, 8, or 16 in accordance with the aggregation level (AL), and the different numbers of CCEs may be used to implement a link adaptation of the downlink control channel. For example, if the aggregation level is AL=L, one downlink control channel may be transmitted through L CCEs. It is necessary for a terminal to detect a signal in a state where the terminal does not know information on the downlink control channel, and a search space indicating a set of CCEs is defined for blind decoding. The search space is a set of downlink control channel candidates composed of CCEs that the terminal should attempt to decode on a given aggregation level, and the terminal has a plurality of search spaces because there are several aggregation levels on which 1, 2, 4, 8, or 16 CCEs are bound into one bundle. The search space set may be defined as a set of search spaces at all configured aggregation levels.

The search space may be classified into a common search space and a UE-specific search space. Terminals in a specific group or all terminals may monitor the common search space of a PDCCH in order to receive dynamic scheduling of system information or cell-common control information such as a paging message. For example, PDSCH scheduling assignment information for transmitting an SIB including operator information of a cell may be received by monitoring the common search space of the PDCCH. In case of the common search space, terminals of a specific group or all terminals should receive the PDCCH, and thus the common search space may be defined as a pre-engaged CCE set. It may be possible to receive scheduling assignment information of a UE-specific PDSCH or PUSCH through monitoring of the UE-specific search space of the PDCCH. The UE-specific search space may be UE-specifically defined as a function of UE identity and various system parameters.

In 5G, parameters for search spaces for the PDCCH may be configured from the base station to the terminal through higher layer signaling (e.g., SIB, MIB, and RRC signaling). For example, the base station may configure, to the terminal, the number of PDCCH candidates at each aggregation level L, a monitoring period for search spaces, a monitoring occasion of an intra-slot symbol unit for search spaces, a search space type (common search space or UE-specific search space), a combination of a DCI format and an RNTI intended to be monitored in corresponding search spaces, and control resource set indexes intended to monitor the search spaces. For example, the search space may include the following information.

TABLE 8

```
SearchSpace ::=                       SEQUENCE {
   -- Identity of the search space. SearchSpaceId = 0 identifies the SearchSpace
   configured via PBCH (MIB) or ServingCellConfigCommon.
   searchSpaceId                      SearchSpaceId,
   (Search space identity)
   controlResourceSetId               ControlResourceSetId,
   (Control resource set identity)
   monitoringSlotPeriodicityAndOffset CHOICE {
   (Monitoring slot level period)
       sl1                            NULL,
       sl2                            INTEGER (0..1),
       sl4                            INTEGER (0..3),
       sl5                            INTEGER (0..4),
       sl8                            INTEGER (0..7),
```

TABLE 8-continued

```
        sl10                    INTEGER (0..9),
        sl16                    INTEGER (0..15),
        sl20                    INTEGER (0..19)
    }
                                OPTIONAL,
    monitoringSymbolsWithinSlot     BIT STRING (SIZE (14))
                                OPTIONAL,
    (Monitoring symbols within slot)
    nrofCandidates              SEQUENCE {
    (the number of PDCCH candidates per aggregation level)
        aggregationLevel1       ENUMERATED {n0, n1, n2, n3, n4,
n5, n6, n8},
        aggregationLevel2       ENUMERATED {n0, n1, n2, n3, n4,
n5, n6, n8},
        aggregationLevel4       ENUMERATED {n0, n1, n2, n3, n4,
n5, n6, n8},
        aggregationLevel8       ENUMERATED {n0, n1, n2, n3, n4,
n5, n6, n8},
        aggregationLevel16      ENUMERATED {n0, n1, n2, n3, n4,
n5, n6, n8}
    },
    searchSpaceType             CHOICE {
    (Search space type)
        -- Configures this search space as common search space (CSS) and DCI
formats to monitor.
        common                  SEQUENCE {
    (Common search space)
        }
        ue-Specific             SEQUENCE {
    (UE-specific search space)
            -- Indicates whether the UE monitors in this USS for DCI formats 0-0 and
1-0 or for formats 0-1 and 1-1.
            formats             ENUMERATED {formats0-0-And-
1-0, formats0-1-And-1-1},
            ...
        }
```

The base station may configure one or a plurality of search space sets to the terminal in accordance with the configuration information. As an example, the base station may configure search space set 1 and search space set 2 to the terminal, and it may configure to monitor DCI format A scrambled by X-RNTI in the common search space in the search space set 1 and to monitor DCI format B scrambled by Y-RNTI in the UE-specific search space in the search space set 2. According to the configuration information, one or a plurality of search space sets may exist in the common search space or the UE-specific search space. For example, search space set #1 and search space set #2 may be configured to the common search space, and search space set #3 and search space set #4 may be configured to the UE-specific search space.

In the common search space, the following combinations of DCI formats and RNTIs may be monitored.
DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI
In the UE-specific search space, the following combinations of DCI formats and RNTIs may be monitored.
DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The above-specified RNTIs may follow the following definitions and purposes.

C-RNTI (Cell RNTI): UE-specific PDSCH scheduling purposes

TC-RNTI (Temporary Cell RNTI): UE-specific PDSCH scheduling purposes

CS-RNTI (Configured Scheduling RNTI): semi-statically configured UE-specific PDSCH scheduling purposes RA-RNTI (Random Access RNTI): PDSCH scheduling purposes at a random access stage P-RNTI (Paging RNTI): PDSCH scheduling purposes for transmitting paging SI-RNTI (System Information RNTI): PDSCH scheduling purposes for transmitting system information INT-RNTI (Interruption RNTI): Purposes for notifying of whether to puncture PDSCH TPC-PUSCH-RNTI (Transmit Power Control for PUSCH RNTI): Power control command indication purposes on PUSCH TPC-PUCCH-RNTI (Transmit Power Control for PUCCH RNTI): Power control command indication purposes on PUCCH TPC-SRS-RNTI (Transmit Power Control for SRS RNTI): Power control command indication purposes for SRS The above-specified DCI formats may follow the definitions below.

TABLE 9

| DCI Format | Purposes |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a plurality of search space sets may be configured by different parameters (e.g., parameters of Table 8), and thus a set of search space sets being monitored by the terminal may differ at each time. For example, in case that search space set #1 is configured in an X-slot period, and search space set #2 is configured in a Y-slot period in a state where X and Y are different from each other, the terminal may monitor all of search space set #1 and search space set #2 in a specific slot, and it may monitor one of search space set #1 and search space set #2 in a specific slot. If a plurality of search space sets are configured to the terminal, the following conditions may be considered in a method for determining search space sets that the terminal should monitor.

[Condition 1: Restriction on the Maximum Number of PDCCH Candidates]

The number of PDCCH candidates that can be monitored per slot does not exceed $M^\mu$. The $M^\mu$ may be defined as the maximum number of PDCCH candidates per slot in a cell in which the subcarrier spacing is configured to $15 \cdot 2^\mu$ kHz, and it may be defined as in the table below.

TABLE 10

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Restriction on the Maximum Number of CCEs]

The number of CCEs constituting the whole search space (here, the whole search space means a set of the total CCEs corresponding to union regions of a plurality of search space sets) per slot does not exceed $C^\mu$. The $C^\mu$ may be defined as the maximum number of CCEs per slot in a cell in which the subcarrier spacing is configured to $15 \cdot 2^\mu$ kHz, and it may be defined as in the table below.

TABLE 11

| $\mu$ | Maximum number of CCEs per slot and per serving cell ($C^\mu$) |
| --- | --- |
| 0 | 56 |
| 1 | 56 |
| 2 | 48 |
| 3 | 32 |

For convenience in technology, a situation where all of the conditions 1 and 2 are satisfied at a specific time is defined as "condition A." Accordingly, a case where the condition A is not satisfied may mean a case where at least one of the conditions 1 and 2 is not satisfied. The case where the above-described condition A is not satisfied may occur in accordance with the configuration of the search space sets of the base station. If the above-described condition A is not satisfied at the specific time, the terminal may select and monitor only a part of the search space sets configured to satisfy the condition A at the corresponding time, and the base station may transmit the PDCCH on the selected search space set.

Methods for selecting a partial search space among all the configured search space sets may be as follows.

[Method 1]

If the condition A for the PDCCH is not satisfied at the specific time (slot), the terminal (or the base station) may preferentially select a search space set of which the search space type is configured to the common search space rather than the search space set of which the search space type is configured to the UE-specific search space among the search space sets existing at the corresponding time.

If all the search space sets of which the search space type is configured to the common search space are selected (i.e., if the condition A is satisfied even after all the search spaces of which the search space type is configured to the common search space are selected), the terminal (or the base station) may select the search space sets of which the search space type is configured to the UE-specific search space. In this case, if there are a plurality of search space sets of which the search space type is configured to the UE-specific search space, the search space set having a low search space set index may have a higher priority. In consideration of the priority, the UE-specific search space sets may be selected within a range in which the condition A is satisfied.

Hereinafter, a method for determining a restriction on the maximum number of PDCCH candidates and a restriction on the maximum number of CCEs, in an environment in which carrier aggregation (CA) in 5G is performed, will be described in detail.

For convenience in explanation of the disclosure hereinafter, explanation will be made in the first consideration of the carrier aggregation, but it will be apparent that the term "carrier aggregation" may be replaced by various expressions, such as dual connectivity, multiple connectivity, or multiple connectivity support in accordance with the environment.

If the terminal may perform the carrier aggregation with respect to four or more cells (which may be called "component carriers (CCs)" in the same manner), the terminal may report capability for the number $N^{cap}$ of downlink cells capable of monitoring PDCCH candidates to the base station. If the terminal is configured with total $N^\mu$ cells in which the subcarrier spacing is configured to $\mu$ from the base station, the terminal may consider the following PDCCH candidate number restriction $M^{total,\mu}$ and CCE number restriction $C^{total,\mu}$ with respect to the configured $N^\mu$ cells.

$$M^{total,\mu}=\min\{N^\mu \cdot M^\mu, \lfloor N^{cap} \cdot M^\mu \cdot N^\mu/N^{total}\rfloor\} \quad \text{[Mathematical expression 1]}$$

$$C^{total,\mu}=\min\{N^\mu \cdot C^\mu, \lfloor N^{cap} \cdot C^\mu \cdot N^\mu/N^{total}\rfloor\} \quad \text{[Mathematical expression 2]}$$

In the mathematical expressions 1 and 2 as described above, $N^{total}$ is $N^{total}=N^0+N^1+N^2+N^3$. The maximum numbers $M^{total,\mu}$ and $C^{total,\mu}$ in the mathematical expressions 1 and 2 are named "first restriction." That is, the first restriction may be the restriction on the maximum number of PDCCH candidates and the maximum number of CCEs that can be applied with respect to one or a plurality of cells in which the subcarrier spacing is configured to μ in case that the terminal having reported a PDCCH additional monitoring UE capability in the CA situation is configured with the carrier aggregation composed of equal to or more than the specific number of cells.

The terminal may be configured with search space sets from the base station, and in this case, it may be expected that the number of search space sets does not exceed the first restriction. That is, it may be expected that the terminal monitors the search spaces composed of the maximum number $M^{total,\mu}$ of PDCCH candidates and the maximum number $C^{total,\mu}$ of CCEs. The base station may configure the search space sets to the terminal so that the search space sets configured to the cells in which the subcarrier spacing is configured to μ do not exceed the first restriction. That is, the base station may configure the search space sets to the terminal so that the total number of PDCCH candidates constituting the search space sets configured to the cells in which the subcarrier spacing is configured to μ does not exceed $M^{total,\mu}$, and the total number of CCEs does not exceed $C^{total,\mu}$.

Based on $M^\mu$ in the table 10 and $C^\mu$ in the table 11 as described above, the terminal is not required to monitor the PDCCH candidates the number of which is larger than $\min(M^\mu, M^{total,\mu})$ or to monitor the CCEs the number of which is larger than $\min(C^\mu, C^{total,\mu})$ with respect to activated bandwidth parts in which the subcarrier spacing is configured to μ in the individually scheduled cells, and the configured numbers are named "second restriction". That is, the second restriction may be the restriction on the maximum number of PDCCH candidates and the maximum number of CCEs that can be applied to a specific cell in which the subcarrier spacing is configured to μ regardless of the UE capability report or the number of cells configuring the carrier aggregation.

In configuring a search space set for a specific cell (e.g., PCell) to the terminal, the base station may notify the terminal of the configuration that does not satisfy the above-described condition A at a specific time, that is, of the configuration including the PDCCH candidates or CCEs the number of which is larger than $M^{total,\mu}$ of the table 10 or $C^\mu$ of the table 11. If the search space of the specific cell exceeds the second restriction when the terminal monitors the search space at the specific time in accordance with the search space configuration of the base station, the terminal may selectively monitor the specific search space set using the procedure of [method 1] as described above.

The base station may configure the search space set with respect to a secondary cell so that the search space set does not exceed the condition A at all times. The terminal may expect the search space set configuration that does not exceed the condition A at all times with respect to the secondary cell.

Figure 6:
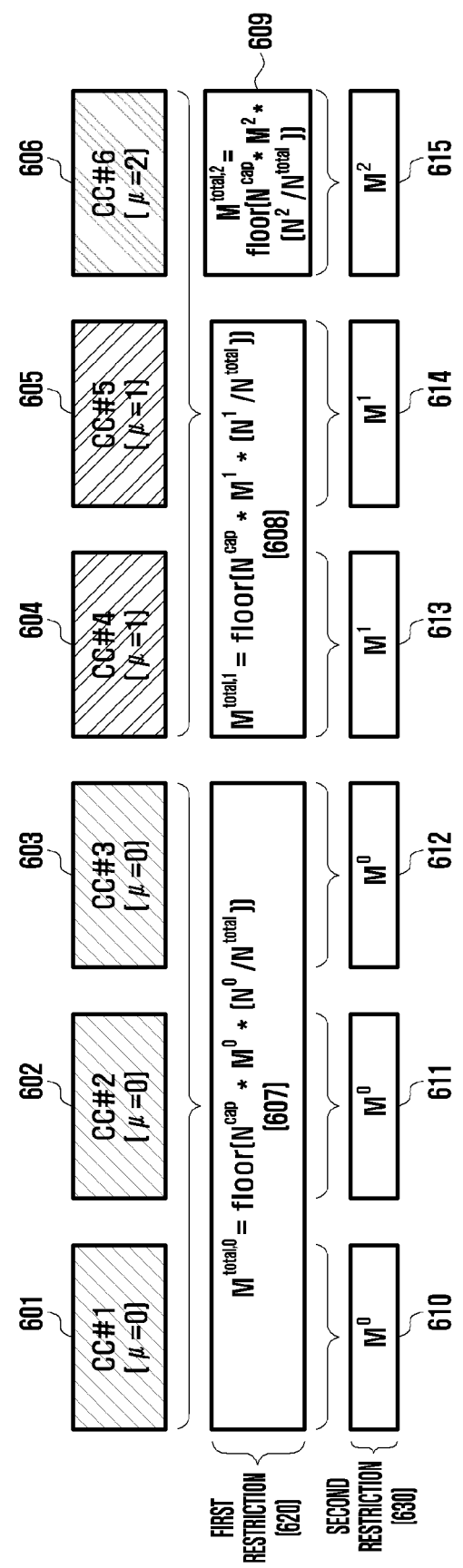
FIG. 6 illustrates a diagram of an example of a method for determining a restriction on the maximum number of PDCCH candidates in 5G.

FIG. 6 illustrates a diagram of an example in which restrictions on the maximum number of PDCCH candidates and the maximum number of CCEs are applied in a carrier aggregation environment.

In FIG. 6, total six cells CC#1 601, CC#2 602, CC#3 603, CC#4 604, CC#5 605, and CC#6 606 are configured. The cells CC#1 601, CC#2 602, and CC#3 603 are configured with a subcarrier spacing of μ=0 (corresponding to 15 kHz), the cells CC#4 604 and CC#5 605 are configured with a subcarrier spacing of μ=1 (corresponding to 30 kHz), and the cell CC#6 606 is configured with a subcarrier spacing of μ=2 (corresponding to 60 kHz). Accordingly, in an example of FIG. 6, the numbers are configured to $N^0=3$, $N^1=2$, $N^2=1$, and $N^{total}=6$. The terminal may report, to the base station, a capability value $N^{cap}$ for the number of downlink cells for monitoring the PDCCH candidates. In the example, it is assumed that $N^{cap}=4$.

With respect to the cells CC#1 601, CC#2 602, and CC#3 603 with the subcarrier spacing of μ=0, a value 607 in accordance with the first restriction 620 on the number of PDCCH candidates may be calculated as follows.

$$M^{total,0}=\min\{N^0 \cdot M^0, \lfloor N^{cap} \cdot M^0 \cdot N^0/N^{total}\rfloor\}=\lfloor N^{cap} \cdot M^0 \cdot N^0/N^{total}\rfloor=88 \quad \text{[Mathematical expression 3]}$$

With respect to the cells CC#4 604 and CC#5 605 with the subcarrier spacing of μ=1, a first restriction value 608 on the number of PDCCH candidates may be calculated as follows.

$$M^{total,1}=\min\{N^1 \cdot M^1, \lfloor N^{cap} \cdot M^1 \cdot N^1/N^{total}\rfloor\}=\lfloor N^{cap} \cdot M^1 \cdot N^1/N^{total}\rfloor=48 \quad \text{[Mathematical expression 4]}$$

With respect to the cell CC#6 606 with the subcarrier spacing of p=2, a first restriction value 609 on the number of PDCCH candidates may be calculated as follows.

$$M^{total,2}=\min\{N^2 \cdot M^2, \lfloor N^{cap} \cdot M^2 \cdot N^2/N^{total}\rfloor\}=\lfloor N^{cap} \cdot M^2 \cdot N^2/N^{total}\rfloor=14 \quad \text{[Mathematical expression 5]}$$

In consideration of the table 10, with respect to the cells CC#1 601, CC#2 602, and CC#3 603 with the subcarrier spacing of μ=0, a value in accordance with the second restriction 630 on the number of PDCCH candidates may be determined as $M^0=44$ (610, 611, 612), and with respect to the cells CC#4 604 and CC#5 605 with the subcarrier spacing of μ=1, a second restriction value on the number of PDCCH candidates may be determined as $M^1=36$ (613, 614). With respect to the cell CC#6 606 with the subcarrier spacing of μ=2, a second restriction value on the number of PDCCH candidates may be determined as $M^2=22$ (615).

Although the restriction values for the number of PDCCH candidates have been described as an example, the restriction value $C^{total,\mu}$ on the number of CCEs can also be calculated in the same method.

If a cell which performs scheduling (i.e., a cell in which downlink control information for scheduling is transmitted or a cell in which the terminal performs monitoring of the PDCCH in the same manner) and a cell to which scheduling is applied (i.e., a cell in which transmission/reception of a data channel is performed in accordance with scheduling information of the received downlink control information or a cell in which the terminal transmits/receives the data channel based on the downlink control information in the same manner) have different subcarrier spacing in an environment in which the base station and the terminal operate to perform cross-scheduling based carrier aggregation in 5G, the maximum PDCCH candidate number restriction and the maximum CCE number restriction as defined above may be determined based on the subcarrier spacing of the "first cell".

More specifically, if the terminal may perform the carrier aggregation with respect to four or more cells, the terminal may report the capability for the number $N^{cap}$ of downlink cells capable of monitoring the PDCCH candidates to the base station. The terminal may be configured with a plurality of cells for the purpose of the carrier aggregation. For example, the terminal may be configured with total $N^\mu$ cells from the base station, and $N^{total}$ may be defined as $N^{total}=N^0+N^1+N^2+N^3$. Here, $N^\mu$ may means the number of cells in which the subcarrier spacing is configured to $\mu$ The respective cells may be configured and operated through self-scheduling or cross-scheduling. The cells configured through cross-carrier scheduling may have different subcarrier spacing. That is, if the subcarrier spacing of the first cell is $\mu_1$, and the subcarrier spacing of the second cell is $\mu_2$, it may be configured that $\mu_1 \neq \mu_2$.

In this case, in a method for calculating the first restriction on the cells in which the subcarrier spacing is configured to $\mu$ (i.e., the maximum number of PDCCH candidates that can be applied with respect to one or a plurality of cells in which the subcarrier spacing is configured to $\mu$), the subcarrier spacing $\mu_2$ of the second cell to which the cross-scheduling is applied may be considered and calculated as the subcarrier spacing $\mu_1$ of the first cell performing the cross-scheduling. That is, $M^{total,\mu}$ may be calculated by the following mathematical expression.

$$M^{total,\mu} = \min\{N_0^\mu \cdot M^\mu, \lfloor N^{cap} \cdot M^\mu \cdot N_0^\mu / N^{total} \rfloor\}$$ [Mathematical expression 6]

Here, it may be defined that $N_0^\mu = N_1^\mu + N_2^\mu$, and $N_1^\mu$ may be defined as the number of cells in which the subcarrier spacing to which the self-scheduling is applied is $\mu$, and $N_2^\mu$ may be defined as the total number of cells in which the subcarrier spacing of the corresponding first cell is $\mu$ among the cells corresponding to the second cell to which the cross-scheduling is applied.

In the same manner, in a method for calculating the second restriction on the cells in which the subcarrier spacing is configured to $\mu$ (i.e., the maximum number of PDCCH candidates that can be applied to a specific cell in which the subcarrier spacing is configured to $\mu$), the subcarrier spacing $\mu_2$ of the second cell to which the cross-scheduling is applied may be considered and calculated as the subcarrier spacing $\mu_1$ of the first cell performing the cross-scheduling. That is, the value $M^{\mu_2}$ of the second cell may be considered as $M^{\mu_1}$.

Because the terminal can perform the PDCCH monitoring for the second cell in the search space configured to the first cell, it may be preferable to calculate the restriction on the maximum number of PDCCH candidates based on the subcarrier spacing of the first cell.

Figure 7:
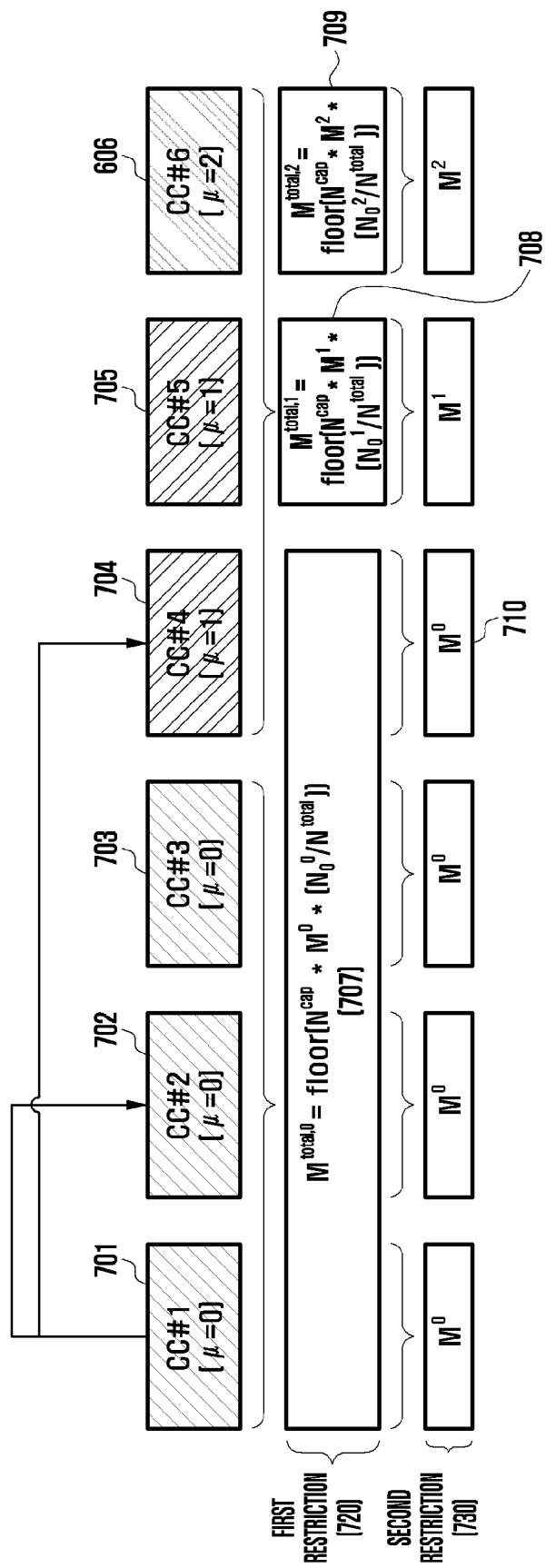
FIG. 7 illustrates a diagram of another example of a method for determining a restriction on the maximum number of PDCCH candidates in 5G.

FIG. 7 illustrates a diagram of an example of a method for calculating the maximum number of PDCCH candidates according to a first embodiment of the disclosure.

FIG. 7 illustrates an example in which total six cells CC#1 701, CC#2 702, CC#3 703, CC#4 704, CC#5 705, and CC#6 706 are configured. The cells CC#1 701, CC#2 702, and CC#3 703 are configured with a subcarrier spacing of $\mu=0$ (corresponding to 15 kHz), the cells CC#4 704 and CC#5 705 are configured with a subcarrier spacing of $\mu=1$ (corresponding to 30 kHz), and the cell CC#6 706 is configured with a subcarrier spacing of $\mu=2$ (corresponding to 60 kHz). Accordingly, in an example of FIG. 7, the numbers are configured to $N^0=3$, $N^1=2$, $N^2=1$, and $N^{total}=6$. The terminal may report, to the base station, a capability value $N^{cap}$ for the number of downlink cells for monitoring the PDCCH candidates. In an example of FIG. 7, it is assumed that $N^{cap}=4$.

In an example of FIG. 7, the cells CC#1 701, CC#3 703, CC#5 705, and CC#6 706 correspond to cells in which scheduling may be performed as self-scheduling, and the cells CC#2 702 and CC#4 704 correspond to cells in which scheduling may be performed as cross-scheduling. In this case, the first cell performing cross-scheduling of CC#2 702 and CC#4 704 may be CC#1 701. CC#1 701 that is the first cell and CC#2 702 that is the second cell may have the same subcarrier spacing (e.g., $\mu_1=\mu_2=\mu=0$), and CC#1 701 that is the first cell and CC#4 704 that is the second cell may have different subcarrier spacing (e.g., $\mu_1=0$, and $\mu_2=1$).

In this case, in calculating $M^{total,\mu}$ according to the first embodiment of the disclosure, $M^{total,\mu}$ may be calculated in consideration of the subcarrier spacing of CC#2 702 and CC#4 702 corresponding to the second cell as the subcarrier spacing of CC#1 701 corresponding to the first cell. That is, $M^{total,\mu}$ may be calculated in a state where the subcarrier spacing of CC#4 704 corresponding to the second cell having the subcarrier spacing that is different from the subcarrier spacing of the first cell is considered as $\mu=0$. That is, as illustrated in FIG. 7, in case of calculating $M^{total,0}$, total four cells CC#1 701, CC#2 702, CC#3 703, and CC#4 704 including CC#4 704 may be considered (707), and in case of calculating $M^{total,1}$, CC#4 704 may be excluded, and one cell CC#5 705 may be included (708). In case of calculating $M^{total,2}$, one cell CC#6 706 may be included (709).

Through computation in accordance with the first restriction 720 as described above based on the mathematical expression 5, the value $M^{total,\mu}$ may be calculated as in the following mathematical expression 7.

$$M^{total,0} = \min\{N_0^0 \cdot M^0, \lfloor N^{cap} \cdot M^0 \cdot N_0^0 / N^{total} \rfloor\} = \lfloor N^{cap} \cdot M^0 \cdot N_0^0 / N^{total} \rfloor = \lfloor 4 \cdot 44 \cdot 4/6 \rfloor = 117,$$

$$M^{total,1} = \min\{N_0^1 \cdot M^1, \lfloor N^{cap} \cdot M^1 \cdot N_0^1 / N^{total} \rfloor\} = \lfloor N^{cap} \cdot M^1 \cdot N_0^1 / N^{total} \rfloor = \lfloor 4 \cdot 36 \cdot 1/6 \rfloor = 24,$$

$$M^{total,2} = \min\{N_0^2 \cdot M^2, \lfloor N^{cap} \cdot M^2 \cdot N_0^2 / N^{total} \rfloor\} = \lfloor N^{cap} \cdot M^2 \cdot N_0^2 / N^{total} \rfloor = \lfloor 4 \cdot 22 \cdot 1/6 \rfloor = 14$$ [Mathematical expression 7]

In the same manner, in case of determining the value in accordance with the second restriction 730 on CC#4 704, the value may not be determined as $M^1$ in consideration of the subcarrier spacing $\mu=1$ of CC#4 704 that is the second cell, but the value may be determined as $M^0$ in consideration of the subcarrier spacing $\mu=0$ of CC#1 701 corresponding to the first cell of CC#4 704 (710).

The terminal may be configured with a search space set for each cell from the base station, and in this case, it may be expected that the search space set does not exceed the first restriction calculated as above. That is, the base station may configure search space sets to the terminal so that the total number of PDCCH candidates, which constitute the search space sets configured to the cells corresponding to the second cell in which the subcarrier spacing of the first cell performing scheduling is configured to p, does not exceed $M^{total,\mu}$ while performing cross-scheduling with the cells in which the subcarrier spacing is configured to pt as self-scheduling is performed.

In configuring the search space set for the specific cell to the terminal, the base station may notify the terminal of the search space configuration that exceeds the second restriction calculated as above at the specific time (corresponding to a case where the above-described condition A is not satisfied). That is, the second restriction on the cells corresponding to the second cell to which cross-scheduling is applied may be calculated from the subcarrier spacing of the first cell performing cross-scheduling of the corresponding cell. When the terminal monitors the search space of the specific cell at the specific time in accordance with the search space configuration of the base station, the search space set may exceed the second restriction. In this case, the terminal may selectively monitor the specific search space set in the procedure of the above-described [method 1].

The base station may configure the search space set with respect to the secondary cell so that the search space set does not exceed the second restriction at all times. The terminal may expect the search space set configuration that does not exceed the second restriction at all times with respect to the secondary cell.

Figure 8:
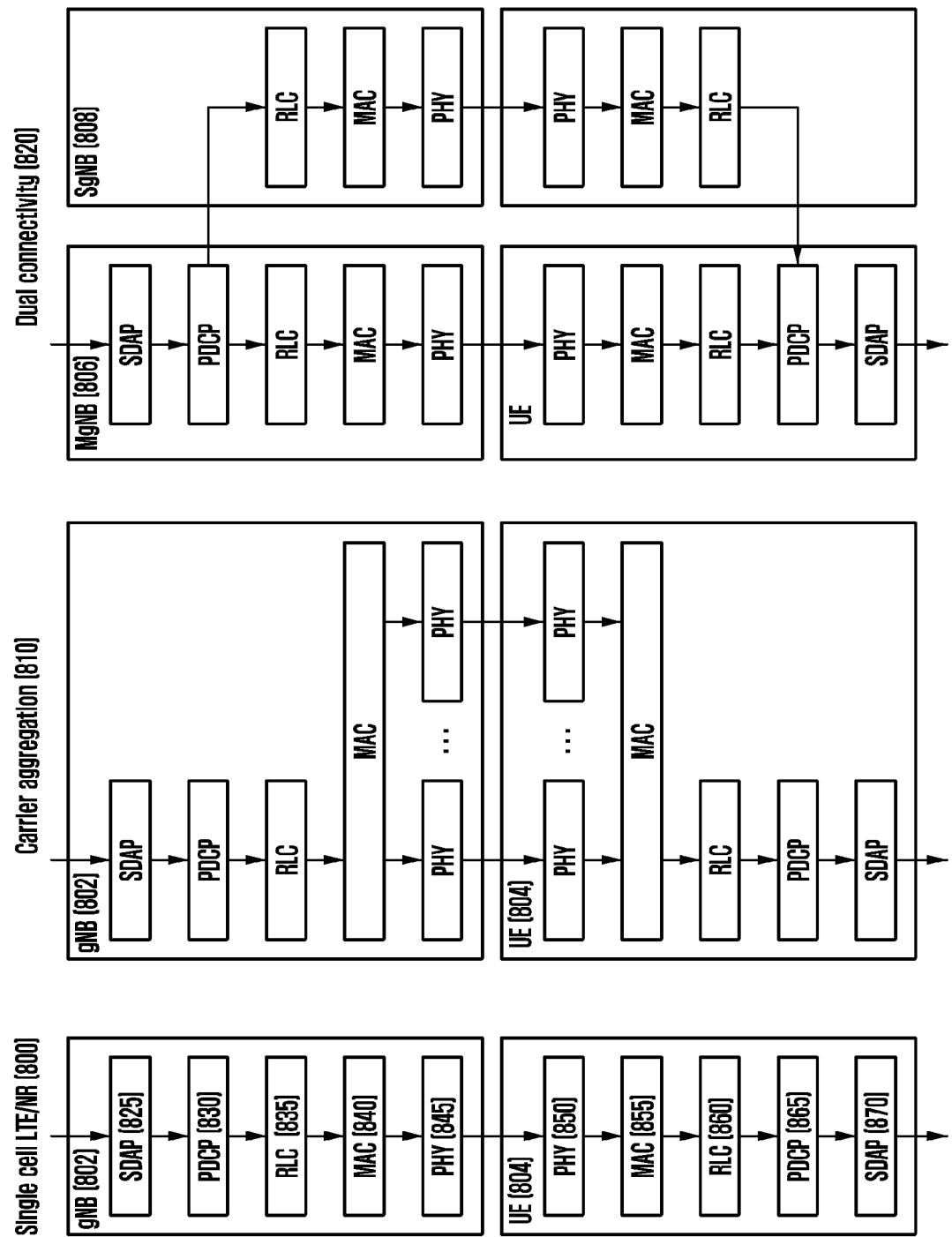
FIG. 8 illustrates a diagram of radio protocol structures of a base station and a terminal during performing of single cell, carrier aggregation, and dual connectivity according to an embodiment of the disclosure.

FIG. 8 illustrates a diagram of radio protocol structures of a base station and a terminal during performing of single cell, carrier aggregation (CA), and dual connectivity (DC) according to an embodiment of the disclosure.

With reference to FIG. 8, the radio protocol of the next-generation mobile communication system includes NR service data adaptation protocol (NR SDAP) 825 and 870, NR packet data convergence protocol (NR PDCP) 830 and 865, NR radio link control (NR RLC) 835 and 860, and NR medium access control (NR MAC) 840 and 855 in a terminal 804 and an NR base station 802.

The primary functions of the NR SDAP 825 and 870 may include some of the following functions.

Transfer of user plane data
Mapping between a QoS flow and a data bearer (DRB) for both a downlink (DL) and an uplink (UL)
Marking QoS flow ID in both downlink (DL) and uplink (UL) packets
Reflective QoS to data bearer (DRB) mapping for uplink (UL) SDAP PDUs With respect to the SDAP layer device, the terminal may be configured with an RRC message indicating whether to use a header of the SDAP layer device or whether to use the function of the SDAP layer device by PDCP layer devices, bearers, or logical channels, and if the SDAP header is configured, this may be indicated by a NAS reflective QoS configuration one-bit indicator and an AS reflective QoS configuration one-bit indicator of the SDAP header so that the terminal can update or reconfigure UL and DL QoS flows and mapping information on the data bearers. The SDAP header may include QoS flow ID information indicating the QoS. The QoS information may be used as a data processing priority for supporting smooth services, scheduling information, and so on.

The primary functions of the NR PDCP 830 and 865 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink Among the above-described functions, the reordering of the NR PDCP device means reordering of PDCP PDUs received from a lower layer based on PDCP sequence numbers (SN), and it may include transferring of data to a higher layer in the order of the reordering, direct transferring without considering the order, recording of the lost PDCP PDUs through the reordering, performing of a status report for the lost PDCP PDUs to a transmission side, or requesting for retransmission of the lost PDCP PDUs.

The primary functions of the NR RLC 835 and 860 may include some of the following functions.

Transfer of upper layer PDUs
In-sequence delivery of upper layer PDUs
Out-of-sequence delivery of upper layer PDUs
Error correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment Among the above-described functions, the in-sequence delivery of the NR RLC device means in-sequence transfer of the RLC SDUs received from a lower layer to a higher layer, and this function may include reassembly of the received RLC SDUs that are segmented from one original RLC SDU, reordering of the received RLC PDUs based on their RLC sequence numbers (SNs) or PDCP sequence numbers (SNs), recording of the lost RLC PDUs through the reordering, performing of a status report for the lost RLC PDUs to a transmission side, requesting for retransmission of the lost RLC PDUs, in-sequence transferring of only the RLC SDUs before being lost to a higher layer in case that the lost RCL SDUs exist, in-sequence transfer of all the RLC SDUs received before a specific timer starts to a higher layer in case that the timer has expired even if the lost RLC SDUs exist, or in-sequence transfer of all the RLC SDUs received up to the present to a higher layer in case that a specific timer has expired even if the lost RLC SDUs exist. Further, the NR RLC device may process the RLC PDUs in the order of their receptions (regardless of their sequence number or the order of the sequence numbers, in the order of their arrival) and it may perform out-of-sequence delivery of the RLC PDUs to the PDCP device. If the received data is a segment, the NR RLC device may receive segments being stored in a buffer or to be received later, reconfigure the received segments into one complete RLC PDU, and then transfer the processed RLC PDU to the PDCP device. The NR RLC layer may not include a concatenation function, and the function may be performed on an NR MAC layer or it may be replaced by a multiplexing function of the NR MAC layer.

The out-of-sequence delivery of the NR RLC device may mean the transfer of the RLC SDUs received from a lower layer directly to a higher layer regardless of their order, and if one original RLC SDU is segmented into several RLC SDUs to be received, the out-of-sequence delivery may include reassembly and transfer of the received RLC SDUs, and recording of the lost RLC PDUs through storing and reordering of the RLC SNs or PDCP SNs of the received RLC PDUs.

The NR MAC 840 and 855 may be connected to several NR RLC layer devices configured in one terminal, and the primary functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 845 and 850 may perform channel coding and modulation of higher layer data, make and transmit OFDM symbols on a radio channel, and perform demodulation and channel decoding of the OFDM symbols received on the radio channel to transfer the demodulated and channel-decoded OFDM symbols to a higher layer.

The details of the radio protocol structure may be variously changed in accordance with a carrier (or cell) operation method. As an example, in case that the base station transmits data to the terminal based on a single carrier (or cell), the base station and the terminal use a protocol structure having a single structure for each layer as indicated by 800. In contrast, in case that the base station transmits data to the terminal based on the carrier aggregation (CA) using a multi-carrier in a single TRP, the base station 802 and the terminal 804 have a single structure until the RLC as indicated by 810, but they use the protocol structure in which the PHY layer is multiplexed through a MAC layer.

As another example, in case that the base station transmits data to the terminal based on dual connectivity using multiple carriers at multiple TRPs, two base stations 806 and 808 and the terminal have a single structure until the RLC as indicated by 820, but they use the protocol structure in which the PHY layer is multiplexed through the MAC layer.

In LTE and NR, the terminal has a procedure of reporting capability supported by the terminal to the corresponding base station in a state where the terminal is connected to a serving base station. In the following description, this is called UE capability (report). The base station may transfer a UE capability enquiry message for requesting the capability report to the terminal that is in a connected state with the base station. The base station may request to include the UE capability for each RAT type in the UE capability message. The request for each RAT type may include a request for UE capability information for a frequency band. Further, in case of the UE capability enquiry message, one RRC message container may request the UE capability for a plurality of RAT types, or the base station may transfer the UE capability enquiry message including the request for each RAT type multiple times. That is, the UE capability enquiry may repeat multiple times, and the terminal may configure and report the corresponding UE capability information message multiple times. In the next-generation mobile communication system, it is possible to request the UE capability for multi-radio dual connectivity (MR-DC) including NR, LTE, and EN-DC. For reference, it is general to initially send the UE capability enquiry message after the terminal is connected, but the base station may request the message under any condition when needed.

At the above-described stage, the terminal having received the UE capability report request from the base station configures the UE capability in accordance with the RAT type requested from the base station and band information. Hereinafter, a method in which the terminal configures the UE capability in the NR system will be described.

1. If the terminal is provided with a list of LTE and/or NR bands from the base station through the UE capability request, the terminal configures a band combination (BC) for cases of EN-DC and NR stand-alone (SA). That is, the terminal configures a candidate list of the BC for the EN-DC and the NR SA based on the bands requested from the base station through FreqBandList. Further, the band priority follows the order described in the FreqBandList.
2. If the base station requests the UE capability report by setting an "eutra-nr-only" flag or "eutra" flag, the terminal completely removes those related to the NR SA and BC from the candidate list of the BC configured as above. Such an operation may be performed only in case that the LTE base station (eNB) requests the "eutra" capability.
3. Thereafter, the terminal removes fallback BCs from the candidate list of the BC configured at the above-described stage. Here, the fallback BC corresponds to a case where a band corresponding to at least one SCell is removed from a certain super set BC, and the fallback BC can be omitted because the super set BC can already cover the fallback BC. This stage is applied even to the MR-DC, and thus this stage is applied even to an LTE band. After this stage, the remaining BCs constitute a final "candidate BC list".
4. The terminal selects the BCs to be reported through selection of the BCs to match the requested RAT type in the final candidate BC list. At this stage, the terminal configures supportedBandCombinationList in the determined order. That is, the terminal configures the BC and UE capability to be reported to match the order of a preconfigured rat-Type. The order may be equal to nr→eutra-nr→eutra. Further, the terminal configures featureSetCombination for the configured supportedBandCombinationList, and it configures a list of "candidate feature set combination" based on the candidate BC list from which the list of fallback BCs (including capability at the same or lower stage) is removed. The "candidate feature set combination" includes all feature set combinations of the NR and EUTRA-NR BC, and it can be obtained from the feature set combinations of containers of UE-NR-Capabilities and UE-MRDC-Capabilities.
5. Further, If the requested rat Type is eutra-nr, and it exerts an influence on LTE and NR feature set configurations, the featureSetCombinations may be included in two containers in all. However, the NR feature set includes only UE-NR-Capabilities.

After the UE capability is configured, the terminal transfers a UE capability information message including the UE capability to the base station. Thereafter, the base station performs scheduling and transmission/reception management suitable to the corresponding terminal based on the UE capability received from the terminal.

In contrast with the existing system, the 5G wireless communication system may support all of services requiring a high transmission speed, services having a very short transmission delay, and services requiring a high connection density. In a wireless communication network including a plurality of cells, transmission and reception points (TRPs), or beams, coordinated transmission between respective cells, TRPs, or/and beams is one of core technologies capable of satisfying the various service requirements by increasing the strength of a signal received by the terminal or efficiently performing an interference control between the cells, TRPs, or/and beams.

Joint transmission (JT) is a representative transmission technology for the coordinated transmission, and through the technology, the strength of the signal received by the terminal may be increased by supporting one terminal through different cells, TRPs, or/and beams. Meanwhile, because the characteristics of channels between the cells, TRPs, or/and beams and the terminal may greatly differ from each other, it is necessary to apply different precoding, MCS, and resource assignment to links between the cells, TRPs, or/and beams and the terminal. In particular, in case of non-coherent joint transmission (NC-JT) supporting non-coherent precoding between the cells, TRPs, or/and beams, it is important to configure individual DL transmission information for the cells, TRPs, or/and beams. Meanwhile, configuration of the individual DL transmission information by cells, TRPs, or/and beams may be an important factor to increase a payload necessary for DL DCI transmission, and this may exert a bad influence on the reception performance of a physical downlink control channel (PDCCH) for transmitting the DCI. Accordingly, in order to support the JT, it is necessary to carefully design a tradeoff between an amount of DCI information and the PDCCH reception performance.

FIG. 9A illustrates a diagram of a joint transmission (JT) technique according to an embodiment of the disclosure. In FIG. 9A, a (900) illustrates coherent joint transmission (C-JT) supporting coherent precoding between respective cells, TRPs, or/and beams. In the C-JT, TRP A 905 and TRP B 910 transmit the same data (PDSCH), and a plurality of TRPs perform joint precoding. This means that the TRP A 905 and the TRP B 910 perform transmission in accordance with the same DMRS ports (e.g., DMRS ports A and B for the two TRPs) for the above-described PDSCH reception. In this case, the terminal 915 may receive one piece of DCI information for receiving one PDSCH demodulated by the DMRS ports A and B.

Meanwhile, b (920) illustrates non-coherent joint transmission (NC-JT) supporting non-coherent precoding between respective cells, TRPs, or/and beams. In the NC-JT, different PDSCHs are transmitted through the respective cells, TRPs, or/and beams, and an individual precoding may be applied to the respective PDSCHs. This means that TRP A 925 and TRP B 930 perform transmission in accordance with different DMRS ports (e.g., DMRS port A for TRP A and DMRS port B for TRP B) for reception of the different PDSCHs. In this case, the terminal 935 may receive two kinds of DCI information for receiving PDSCH A that is demodulated by the DMRS port A and PDSCH B demodulated by the DMRS port B.

Figure 9B:
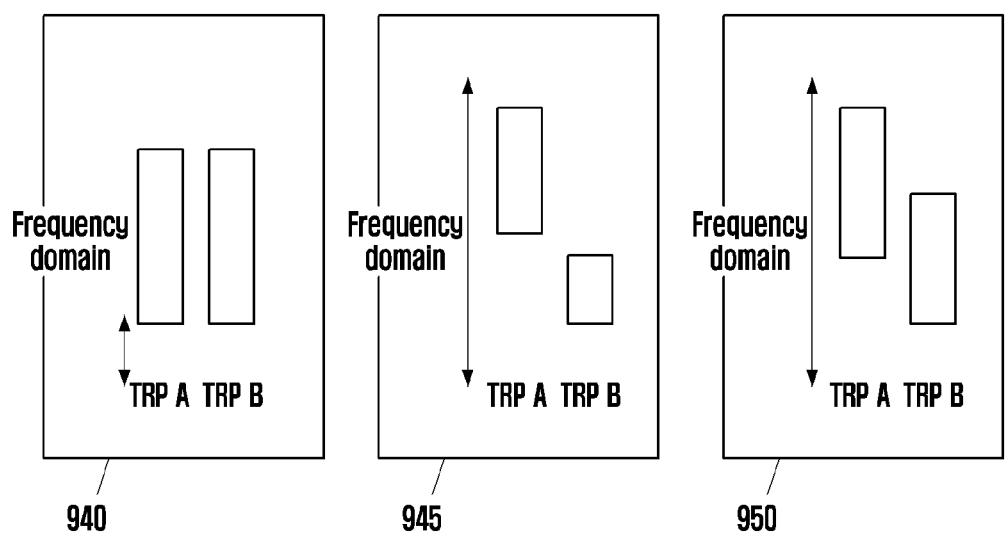
FIG. 9B illustrates a diagram of examples of radio resource assignment per TRP in accordance with situations.

FIG. 9B illustrates a diagram of examples of radio resource assignment per TRP in accordance with situations.

For example, in case of the NC-JT, it is possible to consider various radio resource assignments in case that a plurality of TRPs use the same frequency and time resources (940), in case that the frequency and time resources used by a plurality of TRPs do not overlap each other at all (945), and in case that parts of the frequency and time resources used by a plurality of TRPs overlap each other (950). In particular, in case of 950, it can be known that a DCI payload necessary for resource assignment information is linearly increased in relation to the number of TRPs. The increase of the DL DCI payload as described above may exert a bad influence on the reception performance of a PDCCH for transmitting the DCI or it may greatly increase DCI blind decoding complexity of the terminal as described above. In order to assign a plurality of PDSCHs to one terminal at the same time to support the NC-JT, the DCI having various types, structures, and relations may be considered.

Figure 10:
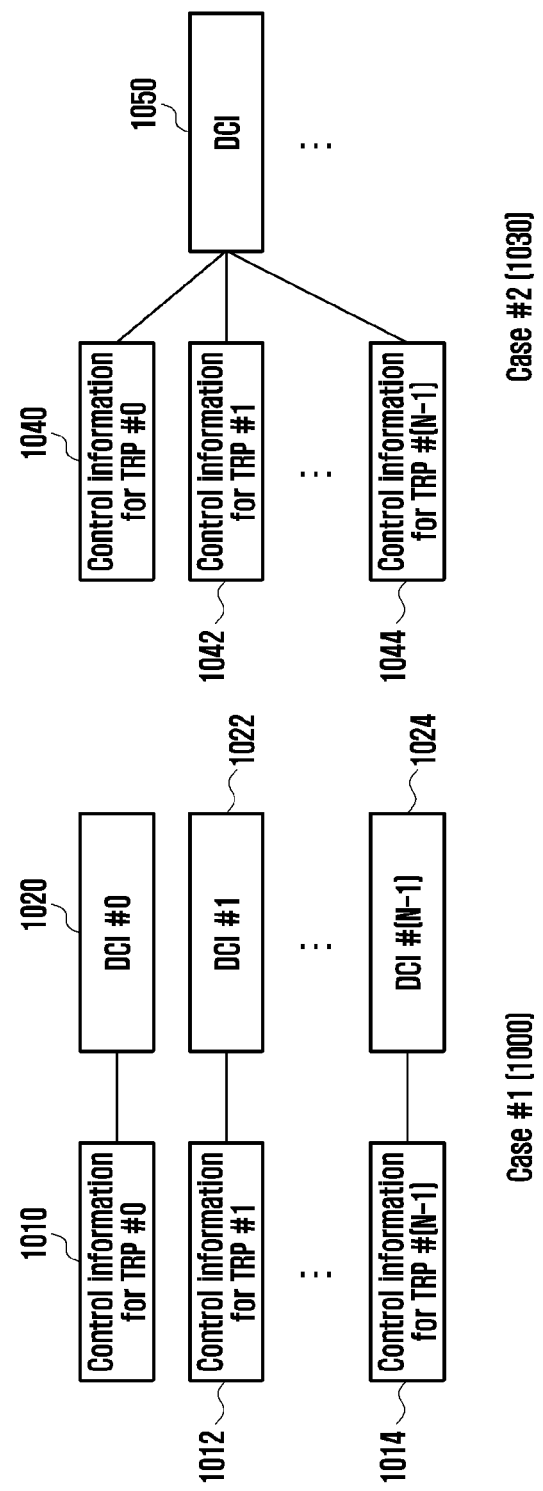
FIG. 10 illustrates a diagram of an example of a control channel configuration for coordinated communication transmission according to an embodiment of the disclosure.

FIG. 10 illustrates a diagram of two examples of DCI designs for supporting NC-JT according to an embodiment of the disclosure.

In FIG. 10, case #1 1000 is an example in which pieces of control information 1010, 1012, and 1014 on PDSCHs transmitted from additional TRPs (TRP #1 to TRP #N-1) are transmitted in the same DCI format as the format of the control information on the PDSCHs transmitted from a serving TRP in a situation that the different (N-1) PDSCHs are transmitted from the additional (N-1) (TRPs TRP#1 to TRP#(N-1) in addition to the serving TRP TRP#0 used during a single PDSCH transmission. That is, the terminal acquires the control information on the PDSCHs transmitted from the different TRPs TRP#0 to TRP#(N-1) through pieces of DCI DCI#0 to DCI#(N-1), 1020, 1022, and 1024 having the same DCI format and the same payload. The case #1 has the advantage that the degree of freedom of PDSCH control (assignment) is completely secured, but it has the disadvantage that a coverage difference for each DCI occurs to deteriorate the reception performance in case that the DCI is transmitted from different TRPs.

Meanwhile, case #2 1030 is an example in which pieces of control information 1040, 1042, and 1044 on PDSCHs transmitted from additional TRPs are transmitted from the same DCI as the control information on the PDSCHs transmitted from a serving TRP in a situation that the different (N-1) PDSCHs are transmitted from the additional (N-1) TRPs TRP#1 to TRP#(N-1) in addition to the serving TRP TRP#0 used during the single PDSCH transmission. That is, the terminal acquires the control information on the PDSCHs transmitted from the different TRPs TRP#0 to TRP#(N-1) through single DCI 1050. The case #2 has the advantage that the DCI blind decoding complexity of the terminal is not increased, but it has the disadvantage that the degree of freedom of PDSCH control (assignment) is low caused by restriction on the number of coordinated TRPs in accordance with restriction on the DCI payload.

In the following explanation and embodiments, the case #1 in which more than one DCI (PDCCH) is used to support the NC-JT is discriminated as the multiple PDCCH based NC-JT, and the case #2 in which a single DCI (PDCCH) is used to support the NC-JT is discriminated as the single PDCCH based NC-JT.

In embodiments of the disclosure, it is possible to replace the "coordinated TRP" by various terms, such as "coordinated panel" or "coordinated beam" during its actual application.

In embodiments of the disclosure, "the case where the NC-JT is applied" may be variously interpreted to match the situation, such as "the case where the terminal simultaneously receives at least one PDSCH from one BWP", "the case where the terminal simultaneously receives the PDSCH based on at least two TCI indications from one BWP", and "the case where the PDSCH received by the terminal is associated with at least one DMRS port group", but one expression is used for convenience in explanation.

In the disclosure, the radio protocol structure for the NC-JT may be variously used in accordance with TRP unfolding scenarios. As an example, in case that a backhaul delay between coordinated TRPs does not exist or low backhaul delay exists, it is possible to use a structure based on MAC layer multiplexing in a similar manner to 810 of FIG. 8 (CA-like method). In contrast, in case that the backhaul delay between the coordinated TRPs is high enough so that the backhaul delay is unable to be disregarded (e.g., if time equal to or more than 2 ms is required for CSI exchange between the coordinated TRPs or scheduling information exchange), it is possible to secure the characteristics robust to the delay using an independent structure for each TRP from an RLC layer in a similar manner to 820 of FIG. 8 (DC-like method).

In LTE and NR systems, the terminal may adjust PDCCH detection attempt complexity of the terminal by controlling restrictions on the maximum number of PDCCH candidates and the maximum number of control channel elements (CCEs) for control channel reception in one slot in accordance with a specific condition, for example, in accordance with the number of downlink serving cells (which may be equally called "component carrier (CC)") configured for the carrier aggregation.

Meanwhile, the terminal can be assigned with one or more PDSCHs at one time for the purpose of performing coordinated communication transmission such as NC-JT, and in this case, respective PDSCHs may be assigned by different PDCCHs. Accordingly, if the coordinated communication transmission is performed when a large number of serving cells exist in a state where the terminal control channel detection complexity in the related art is maintained as it is, the number of control channels that should be actually transmitted in possible control channel resource sets is abruptly increased, and thus the degree of freedom of control channel transmission of the base station is greatly reduced, and the control channel interference control performance may deteriorate.

Various embodiments of the disclosure propose a method for determining restrictions on the maximum number of PDCCH candidates and the maximum number of CCEs defined as above in an environment in which the carrier aggregation in 5G and the NC-JT operate at the same time.

Hereinafter, for simplicity in explanation in describing the disclosure, the restriction value $M^{total,\mu}$ on the number of PDCCH candidates will be described as an example. This may be applied in the same manner in calculating the restriction value $C^{total,\mu}$ on the number of CCEs.

Hereinafter, for simplicity in explanation in describing the disclosure, a cell in which scheduling is performed is called a first cell, and a cell to which scheduling information of the first cell is applied is called a second cell.

First Embodiment: Method for Managing Restrictions on the Maximum Number of PDCCH Candidates and the Maximum Number of CCEs in Consideration of an NC-JT In the first embodiment, methods for managing restrictions on the maximum number of PDCCH candidates and the maximum number of CCEs in consideration of an NC-JT are provided.

For the NC-JT, it is possible for the base station to assign a plurality of PDSCHs to the terminal in the same cell and bandwidth part at the same time through a plurality of PDCCHs. If the base station determines the restrictions on the maximum number of PDCCH candidates and the maximum number of CCEs using only [condition A], [first restriction], and [second restriction] as described above in a situation where the base station operates the NC-JT and the carrier aggregation at the same time, the plurality of PDCCHs for the NC-JT should be transmitted within the restrictions on the maximum number of PDCCH candidates and the maximum number of CCEs, such as the plurality of PDCCHs for the carrier aggregation, and thus the degree of freedom of PDCCH transmission for the existing carrier aggregation is unable to be maintained.

To solve this, it is possible to introduce "UE capability report for additional PDCCH candidate monitoring" in addition to the UE capability report for the number $N^{cap}$ of downlink cells capable of monitoring the PDCCH candidates, and thus to extend the restrictions on the maximum number of PDCCH candidates and the maximum number of CCEs. The UE capability report for the additional PDCCH candidate monitoring may be notification of whether carrier aggregation and separate additional PDCCH candidate monitoring are possible or the degree of the additional PDCCH candidate monitoring through additional signaling, for example, through pdcch-BlindDetectionNCJT∈{1 or 2}, in addition to pdcch-BlindDetectionCA that is the UE capability report for the PDCCH monitoring for the carrier aggregation. This means that it is possible to extend the restrictions on the maximum number of PDCCH candidates and the maximum number of CCEs, if needed, even in case that the number $N^{cap}$ of downlink cells is not sufficiently large (e.g., is not larger than 4).

Specifically, the base station can extend the restrictions on the maximum number of PDCCH candidates and the maximum number of CCEs through the following methods only with respect to the terminal having performed the UE capability report for the additional PDCCH candidate monitoring among the terminals supporting the NC-JT.

[Method A]

According to [Method A], if corresponding signaling exists (e.g., if pdcch-BlindDetectionNCJT is reported to the base station), the restrictions on the maximum number of PDCCH candidates and the maximum number of CCEs in the related art are increased in a specific ratio (e.g., twice) through the UE capability report for the additional PDCCH candidate monitoring. The specific ratio may be one of a predetermined value in accordance with the kind of the UE capability report for the additional PDCCH candidate monitoring and a value indicated through higher layer signaling.

It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by cell groups/cells/bandwidth parts. Table 12 below presents an example of a change of restrictions on the maximum number of PDCCH candidates and the maximum number of CCEs by [Method A].

TABLE 12

If the terminal is configured with four or less downlink cells with respect to possible subcarrier spacing $\mu$ = 0, 1, 2, 3 ($\Sigma_{\mu=0}^{3} N^{\mu} \leq 4$), restrictions on the maximum number of PDCCH candidates and the maximum number of CCEs follow $M^{\mu}$ of the table 10 and $C^{\mu}$ of the table 11.
If the terminal is configured with more than four downlink cells with respect to possible subcarrier spacing $\mu$ = 0, 1, 2, 3 ($\Sigma_{\mu=0}^{3} N^{\mu} > 4$), and reports the UE capability report pdcch-BlindDetectionCA for PDCCH monitoring for carrier aggregation to the base station, restrictions on the maximum number of PDCCH candidates and the maximum number of CCEs follow the mathematical expression 1 and the mathematical expression 2.
If the terminal is configured with four or less downlink cells with respect to possible subcarrier spacing $\mu$ = 0, 1, 2, 3 ($\Sigma_{\mu=0}^{3} N^{\mu} \leq 4$), and reports the UE capability report pdcch-BlindDetectionNCJT for additional PDCCH candidate monitoring to the base station, restrictions on the maximum number of PDCCH candidates and the maximum number of CCEs follow X times (e.g., X = 2) $M^{\mu}$ of the table 10 and TABLE 12-continued $C^\mu$ of the table 11.
If the terminal is configured with more than four downlink cells with respect to
possible subcarrier spacing $\mu = 0, 1, 2, 3$ ($\Sigma_{\mu=0}^{3} N^\mu > 4$), and reports the UE capability
report pdcch-BlindDetectionCA for PDCCH monitoring for carrier aggregation to
the base station, and reports the UE capability report pdcch-BlindDetectionNCJT
for additional PDCCH candidate monitoring to the base station, restrictions on the
maximum number of PDCCH candidates and the maximum number of CCEs
follow X times (e.g., X = 2) the mathematical expression 1 and the mathematical
expression 2.

Table 13 below presents an example of a change of restrictions on the maximum number of PDCCH candidates and the maximum number of CCEs by [Method A].

TABLE 13

If the terminal is configured with four or less downlink cells with respect to
possible subcarrier spacing $\mu = 0, 1, 2, 3$ ($\Sigma_{\mu=0}^{3} N^\mu \leq 4$), restrictions on the maximum
number of PDCCH candidates and the maximum number of CCEs follow $M^\mu$ of
the table 10 and $C^\mu$ of the table 11.
If the terminal is configured with more than four downlink cells with respect to
possible subcarrier spacing $\mu = 0, 1, 2, 3$ ($\Sigma_{\mu=0}^{3} N^\mu > 4$), and reports the UE capability
report pdcch-BlindDetectionCA for PDCCH monitoring for carrier aggregation to
the base station, restrictions on the maximum number of PDCCH candidates and
the maximum number of CCEs follow the mathematical expression 1 and the
mathematical expression 2.
If the terminal is configured with more than four downlink cells with respect to
possible subcarrier spacing $\mu = 0, 1, 2, 3$ ($\Sigma_{\mu=0}^{3} N^\mu > 4$), and reports the UE capability
report pdcch-BlindDetectionCA for PDCCH monitoring for carrier aggregation to
the base station, and reports the UE capability report pdcch-BlindDetectionNCJT
for additional PDCCH candidate monitoring to the base station, restrictions on the
maximum number of PDCCH candidates and the maximum number of CCEs
follow mathematical expressions 8 and 9 below. In the mathematical expression 8
and the mathematical expression 9, X may be a value following a specific constant
or a UE report, for example, X may be X = 2. The mathematical expressions 8 and 9
may be based on the mathematical expressions 1 and 2.
[Mathematical expression 8]
$M^{total, \mu} = \min\{N^\mu \cdot M^\mu, [X \cdot N^{cap} \cdot M^\mu \cdot N^\mu/N^{total}]\}$
[Mathematical expression 9]
$C^{total, \mu} = \min\{N^\mu \cdot C^\mu, [X \cdot N^{cap} \cdot C^\mu \cdot N^\mu/N^{total}]\}$ In addition to the tables 12 and 13, various modifications are possible, but are not enumerated herein in order to avoid obscuring of the gist of the explanation.

[Method B]

According to [Method B], if corresponding signaling exists (e.g., if pdcch-BlindDetectionNCJT is reported to the base station), the condition to control the restrictions on the maximum number of PDCCH candidates and the maximum number of CCEs in the related art is extended through the UE capability report for the additional PDCCH candidate monitoring. It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by cell groups/cells/bandwidth parts.

As an example, if at least one condition is satisfied between condition 1) on which the terminal is configured with more than four downlink cells with respect to possible subcarrier spacing $\mu=0, 1, 2, 3$, and the terminal reports the UE capability report pdcch-BlindDetectionCA for PDCCH monitoring for carrier aggregation to the base station and condition 2) on which the terminal reports the UE capability report pdcch-BlindDetectionNCJT for additional PDCCH candidate monitoring to the base station, it is possible to engage for the extension of the restrictions on the maximum number of PDCCH candidates and the maximum number of CCEs. Table 14 below presents an example of a change of the restrictions on the maximum number of PDCCH candidates and the maximum number of CCEs by [Method B].

TABLE 14

If the terminal is configured with four or less downlink cells with respect to
possible subcarrier spacing $\mu = 0, 1, 2, 3$ ($\Sigma_{\mu=0}^{3} N^\mu \leq 4$), restrictions on the maximum
number of PDCCH candidates and the maximum number of CCEs follow $M^\mu$ of the
table 10 and $C^\mu$ of the table 11.
If the terminal is configured with more than four downlink cells with respect to
possible subcarrier spacing $\mu = 0, 1, 2, 3$ ($\Sigma_{\mu=0}^{3} N^\mu > 4$), and the terminal reports the
UE capability report pdcch-BlindDetectionCA for PDCCH monitoring for carrier
aggregation to the base station, or reports the UE capability report pdcch-
BlindDetectionNCJT for additional PDCCH candidate monitoring to the base station, TABLE 14-continued restrictions on the maximum number of PDCCH candidates and the maximum number of CCEs follow the mathematical expression 1 and the mathematical expression 2.

In addition to the table 14, various modifications are possible, but are not enumerated herein in order to avoid obscuring of the gist of the explanation.

[Method C]

According to [Method C], if corresponding signaling exists (e.g., if pdcch-BlindDetectionNCJT is reported to the base station), the definition of the number of downlink cells configured to the terminal in the related art is changed through the UE capability report for the additional PDCCH candidate monitoring. It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by cell groups/cells/bandwidth parts. As an example, if the UE capability report for the additional PDCCH candidate monitoring is applied to all the cells, the terminal multiplies the configured number of downlink cells by the number of PDSCHs for the NC-JT (or the number of codewords or a value that is signaled or reported by the terminal), and if the value is larger than a specific value (e.g., 4), it is possible to engage for the extension of the restrictions on the maximum number of PDCCH candidates and the maximum number of CCEs. Table 15 below presents an example of a change of the restrictions on the maximum number of PDCCH candidates and the maximum number of CCEs by [Method C].

In the present embodiment, [Method A] to [Method C] are not exclusive to each other, but can be combined and applied together. For example, [Method C] may be applied in consideration of the mathematical expressions 3 and 4 in [Method A].

Hereinafter, for convenience in explanation, the restriction on the maximum number of PDCCH candidates and the maximum number of CCEs by [Method A] to [Method C] may be called a third restriction.

Figure 11:
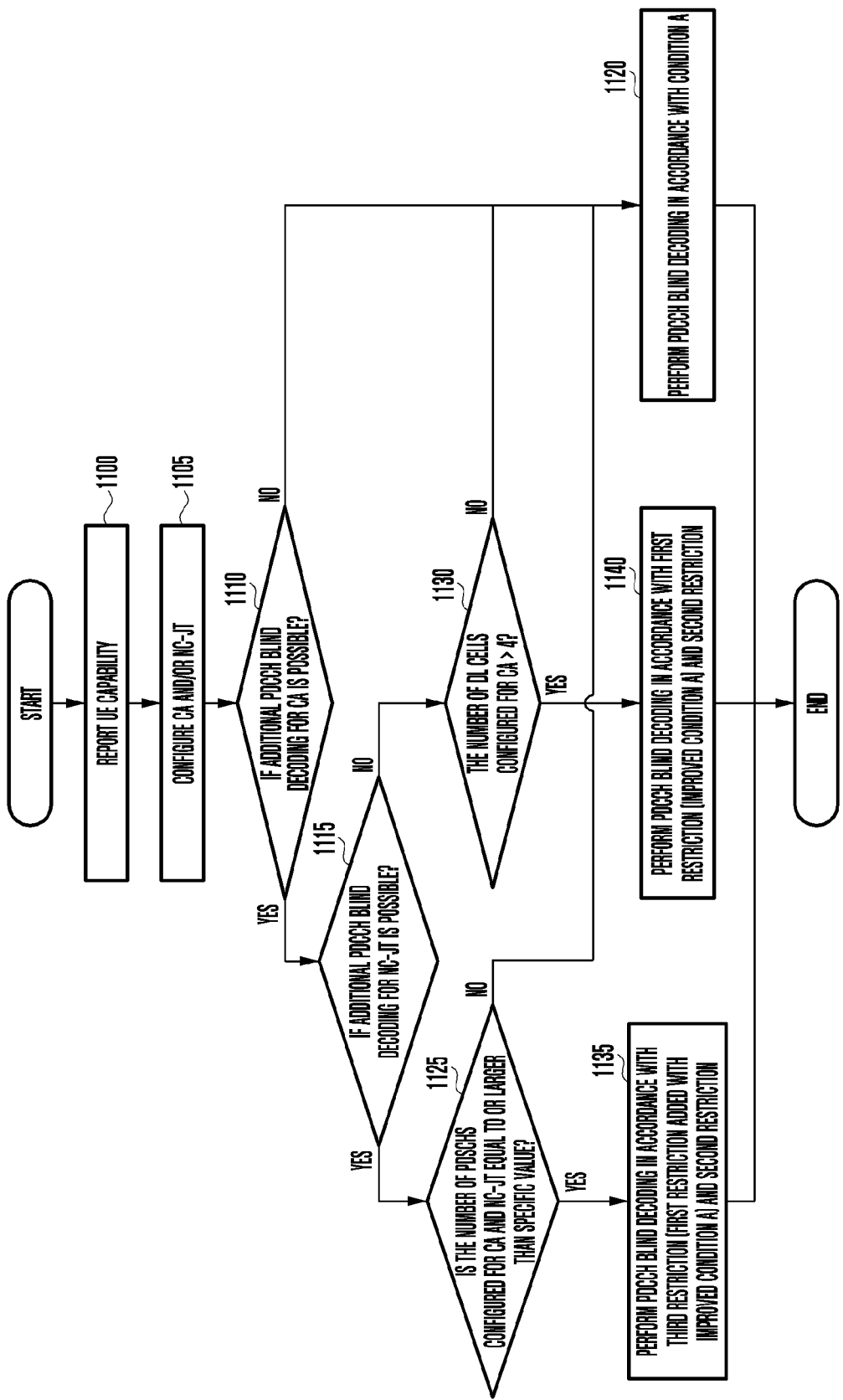
FIG. 11 illustrates a diagram of an example of a method for managing restrictions on the maximum number of PDCCH candidates and the maximum number of CCEs according to an embodiment of the disclosure.

FIG. 11 illustrates a diagram of an operation of a terminal to determine restrictions on the maximum number of PDCCH candidates and the maximum number of CCEs according to an embodiment of the disclosure. At operation 1100, with respect to a base station, the terminal performs a UE capability report (e.g. pdcch-BlindDetectionCA) for PDCCH monitoring for carrier aggregation and a UE capability report (e.g. pdcch-BlindDetectionNCJT) notifying whether additional PDCCH candidate monitoring is possible and the degree of the additional PDCCH candidate monitoring. At operation 1105, the base station performs higher layer configurations for downlink cells for carrier aggregation, whether an NC-JT transmission is possible, or whether multi-PDCCH based NC-JT transmission is possible based on the UE capability reports. Thereafter, the base station and the terminal determine whether additional PDCCH blind decoding for CA is possible by the UE capability report and subsequent higher layer configuration values (1110). If the

TABLE 15

If the terminal is configured with four or less downlink cells with respect to possible subcarrier spacing $\mu = 0, 1, 2, 3$ ($\Sigma_{\mu=0}^{3} N^{\mu} \leq 4$), restrictions on the maximum number of PDCCH candidates and the maximum number of CCEs follow $M^{\mu}$ of the table 10 and $C^{\mu}$ of the table 11.
If a condition $\Sigma_{\mu=0}^{3} X \cdot N^{\mu} \leq 4$ (e.g., X = 2), is satisfied by the number of downlink cells with which the terminal is configured with respect to possible subcarrier spacing $\mu = 0, 1, 2, 3$, and the UE capability report pdcch-BlindDetectionNCJT for the additional PDCCH candidate monitoring, restrictions on the maximum number of PDCCH candidates and the maximum number of CCEs follow $M^{\mu}$ of the table 10 and $C^{\mu}$ of the table 11.
If the terminal is configured with more than four downlink cells with respect to possible subcarrier spacing $\mu = 0, 1, 2, 3$ ($\Sigma_{\mu=0}^{3} N^{\mu} > 4$), and the terminal reports the UE capability report pdcch-BlindDetectionCA for PDCCH monitoring for carrier aggregation to the base station, or reports the UE capability report pdcch-BlindDetectionNCJT for additional PDCCH candidate monitoring to the base station, restrictions on the maximum number of PDCCH candidates and the maximum number of CCEs follow the mathematical expression 1 and the mathematical expression 2.
If a condition $\Sigma_{\mu=0}^{3} X \cdot N^{\mu} \leq 4$ (e.g., X = 2) is satisfied by the number of downlink cells with which the terminal is configured with respect to possible subcarrier spacing $\mu = 0, 1, 2, 3$ and the UE capability report pdcch-BlindDetectionNCJT for the additional PDCCH candidate monitoring, restrictions on the maximum number of PDCCH candidates and the maximum number of CCEs follow the mathematical expression 1 and the mathematical expression 2.

In addition to the table 15, various modifications are possible, but are not enumerated herein in order to avoid obscuring of the gist of the explanation. It is possible to differently apply the restrictions on the maximum number of PDCCH candidates and the maximum number of CCEs by [Method A] to [Method C] by frequency bands (e.g., frequency range 1 equal to or lower than 6 GHz versus frequency range 2 higher than 6 GHz).

additional PDCCH blind decoding is not possible, the terminal performs PDCCH blind decoding in accordance with the [condition A] (1120).

In contrast, if the additional PDCCH blind decoding is possible, the terminal additionally determines whether additional PDCCH blind decoding for an NC-JT is possible (1115), and if the additional PDCCH blind decoding for the NC-JT is not possible, the terminal determines whether the number of downlink cells configured for the carrier aggregation is larger than 4 (1130). If the number of downlink cells is equal to or smaller than 4 as the result of the determination, the terminal may perform PDCCH decoding without changing restrictions on the maximum number of PDCCH candidates and the maximum number of CCEs (1120), whereas if the number of downlink cells is larger than 4, the terminal may perform the PDCCH decoding by increasing the restrictions on the maximum number of PDCCH candidates and the maximum number of CCEs, that is, in accordance with a first restriction and a second restriction (1140).

If the additional PDCCH blind decoding for the NC-JT is possible as the result of the determination at operation 1115, the terminal, at operation 1125, may additionally determine whether the third restriction is applicable in accordance with the above-described method (e.g., depending on whether the maximum number of PDSCHs configured for the CA and NC-JT is equal to or larger than a specific value). In accordance with the result of the determination, the terminal may perform the PDCCH decoding without changing the restrictions on the maximum number of PDCCH candidates and the maximum number of CCEs (1120), or the terminal may perform the PDCCH decoding in accordance with the third restriction and the second restriction by additionally increasing the restrictions on the maximum number of PDCCH candidates and the maximum number of CCEs (1135).

Further, the contents of FIG. 11 are applied to the base station, and the base station may determine the restrictions on the maximum number of PDCCH candidates and the maximum number of CCEs of the terminal in accordance with the contents of FIG. 11.

Second Embodiment: Method for Processing PCell PDCCH Overbooking in Consideration of the NC-JT In the second embodiment, in case of applying the NC-JT, the PDCCH resource is overbooked, that is, the restrictions on the maximum number of PDCCH candidates and the maximum number of CCEs are larger than those in case of the [condition A], and thus it is required to drop partial search spaces by applying the [Method 1].

At present, the [Method 1] is applied only to the PCell (i.e., in case of an SCell, it is required to configure the restrictions on the maximum number of PDCCH candidates and the maximum number of CCEs to satisfy the [condition A]), and thus it may be understood that the explanation of the present embodiment is restricted to the PCell. However, the explanation of the present embodiment is not limited thereto, but it can be further extended to the SCell and PCell.

According to the [Method 1], if the [condition A] is not satisfied at a specific time (slot), the terminal preferentially selects a common search space among search space sets existing at the corresponding time. If the [condition A] is satisfied even after all the search spaces configured as the common search space only are selected, the terminal may additionally select the search space sets that are configured as UE-specific search spaces. In this case, if there are a plurality of search space sets that are configured as the UE-specific search spaces, the search space set having a low search space set index may have a higher priority. In consideration of the priority, it is possible to select the UE-specific search space sets within a range where the condition A is satisfied.

As described above, individual search spaces are connected to one control resource set (CORESET) and indicated with frequency axis resource information on which the PDCCH can be transmitted and TCI state information (i.e., space related information or QCL information), and in case of the NC-JT for which a plurality transmission points are used at a time, it may be necessary to use one or more pieces of TCI state information at one time (e.g., slot). Considering that one piece of TCI state information can be allocated (or activated) for one control resource set, it can be known that, in case of NC-JT transmission, the selected search spaces should be connected to one or more control resource sets at one time. If the selection of the search space set is determined by a single reference (search space set index) as in the [Method 1], it is not guaranteed to satisfy the condition as described above, and thus the base station and the terminal can guarantee that at least one search space for each control resource set (i.e., for each transmission point or TRP) is selected at a specific time (slot) with respect to the terminal to which multi-PDCCH based NC-JT can be applied through the NC-JT related UE capability report or other higher layer configurations.

To guarantee that the at least one search space for each control resource set (i.e., for each transmission point or TRP) is selected at the specific time (slot) may be performed through various examples as follows.

1) If UE-specific search spaces within a specific time (slot) are connected to control resource sets having two or more different TCI states during selection of the UE-specific search spaces at the corresponding time, the terminal should select at least one search space connected to the second control resource set. This means that if the UE-specific search spaces within the corresponding time are connected to the control resource sets having two or more different TCI states, the selected search spaces should be connected to the control resource sets having two or more different TCI states. In this case, it is still possible to determine the priorities of the respective search space sets by means of search space set indexes.

2) In case of the NC-JT, overbooking of the PDCCH resource (i.e., the configured restrictions on the maximum number of PDCCH candidates and the maximum number of CCEs are larger than those in case of the [condition A], and thus it is required to drop the partial search spaces) may not be supported. This means that if the PDCCH resource is overbooked and it is required to perform search space selection as in the [Method 1], the terminal does not perform multi-PDCCH reception for the NC-JT. As another interpretation, if the UE-specific search spaces selected at the specific time (slot) are connected only to one CORESET (or only to one TCI state or one TRP), the terminal can be guaranteed not to perform the multi-PDCCH based NC-JT operation.

3) If the UE-specific search spaces within the specific time (slot) are connected to two or more control resource sets during selection of the UE-specific search spaces at the corresponding time, it is required for the terminal to select at least one search space connected to the second control resource set. This may be achieved by a method in which the terminal configures the priority through a combination with another index, such as a PDCCH candidate index or control resource set (CORESET) index, in addition to the search space set index in case that the UE-specific search spaces within the corresponding time (slot) are connected to the control resource sets having two or more different TCI states.

For example, if the UE-specific search spaces within the specific time (slot) are connected to the control resource set(s) having one (or the same) TCI state, the terminal configures the priority based on the search space set index only in the same manner as the [Method 1]. In contrast, if the UE-specific search spaces within the specific time (slot) are connected to the control resource sets having different TCI states, the terminal may configure the priorities, such as first-order-(PDCCH candidate index #0, search space set index #0), second-order-(PDCCH candidate index #0, search space set index #1), third-order-(PDCCH candidate index #1, search space set index #0), fourth-order-(PDCCH candidate index #1, search space set index #1), and so on, using pairs of a PDCCH candidate index and a search space set index through the change of the [Method 1]. The above-described method may be extended in a similar manner even in case of using pairs of a control resource set index and a search space set index, but the detailed explanation thereof will be omitted.

In this case, it is still possible to determine the priorities of respective search space sets by means of search space set indexes.

Third Embodiment: Maximum Spacing Between Monitoring Occasions in Consideration of NC-JT In the third embodiment, a method for guaranteeing a processing time of a terminal through restriction of the maximum spacing between monitoring occasions in consideration of an NC-JT is provided.

Figure 12:
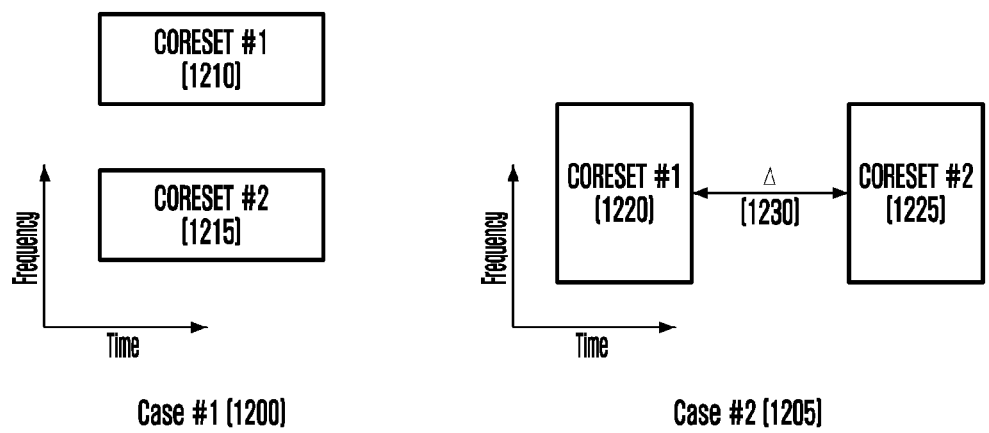
FIG. 12 illustrates a diagram of an example of control channel multiplexing for coordinated communication transmission according to an embodiment of the disclosure.

FIG. 12 illustrates a diagram of an example of multiplexing control resource sets in which PDCCHs by TRPs are transmitted during multi-PDCCH based NC-JT transmission. With reference to FIG. 12, it is possible that control resource set (CORESET) #1 1210 and 1220 including a PDCCH of the first transmission point (TRP) and control resource set (CORESET) #2 1215 and 1225 including a PDCCH of the second transmission point (TRP) are frequency-division-multiplexed (FDM-multiplexed) using different frequency resources at the same time (at least one same OFDM symbol) in a similar manner to the first case 1200, or they are transmitted at different time points (overlapping OFDM symbols do not exist) in a similar manner to the second case 1205.

The first case 1200 may be used in frequency range 1 (FR1) that is equal to or lower than 6 GHz, in which beams between transmission points may be equal to each other (or QCL-type-D refers to the same reference signal), but it may not be easy to apply the first case 1200 in frequency range 2 (FR2) that is higher than 6 GHz, in which there is a high probability that the beams between the transmission points are different from each other (or QCL-type-D refers to different reference signals). Accordingly, it is possible to freely change the beams in accordance with the change of the transmission points by permitting monitoring of only PDCCHs transmitted from one transmission point at one time (OFDM symbol) as in the second case 1205.

In this case, if there is no restriction on a time interval A 1230 between the PDCCHs transmitted from the respective transmission points, the terminal is not aware of whether the PDSCH allocated by the first PDCCH is a PDSCH of a single transmission point (single TRP PDSCH) or a PDSCH of a multi-transmission point (multi-TRP PDSCH or NC-JT PDSCH) before detecting the additional (second) PDCCH in the second control resource set 1225 after the first PDCCH is detected in the first control resource set 1220, and thus it may not be possible to sufficiently prepare for the PDSCH reception. For this, it is possible to set a restriction on the time interval A 1230 required to detect the additional (second) PDCCH in the second control resource set 1225 after the first PDCCH is detected in the first control resource set 1220.

As an example, for the time interval A 1230, it may be engaged that the first PDCCH detected in the first control resource set 1220 and the second PDCCH detected in the second control resource set 1225 exist in the same slot. As another example, it may be engaged that the time interval A 1230 is defined as a value between the last OFDM symbol in which the first PDCCH detected in the first control resource set 1220 is transmitted and the first OFDM symbol in which the second PDCCH detected in the second control resource set 1225, and the time interval A 1230 is smaller than a predetermined specific value or a specific value being signaled to a higher layer. This means that if the second PDCCH allocating the NC-JT PDSCH is not detected after the time interval A 1230 after the first PDCCH is detected, the terminal considers the PDSCH allocated by the first PDCCH as a single transmission point PDSCH (single TRP PDSCH) and it perform operations necessary for the PDSCH reception.

Fourth Embodiment: Method for Managing Restrictions on the Maximum PDCCH Candidates and the Maximum Number of CCEs in Consideration of a Combination of CA or DC with NC-JT In the fourth embodiment, methods for managing restrictions on the maximum number of PDCCH candidates and the maximum number of CCEs in consideration of a case where a CA or a DC and an NC-JT are operated together are provided.

A base station may configure a terminal having reported that a DC operation is possible through a UE capability report to perform the DC operation. Only the terminal that reports that the DC operation is possible through the UE capability report may report pdcch-BlindDetectionMCG-UE and pdcch-BlindDetectionSCG-UE, which are PDCCH monitoring UE capability reports for a master cell group (MCG) and a secondary cell group (SCG). In this case, the value of pdcch-BlindDetectionMCG-UE or pdcch-BlindDetectionSCG-UE is one of [1, . . . , pdcch-BlindDetectionCA-1], and the sum of the values of pdcch-BlindDetectionMCG-UE and pdcch-BlindDetectionSCG-UE should be equal to or larger than the value of pdcch-BlindDetectionCA. This is to guarantee the degree of freedom of scheduling of the base station.

If the terminal is configured not to perform the DC operation, the terminal may determine the number $N^{cap}$ of downlink cells capable of monitoring PDCCH candidates through one of the methods of the embodiments 1 to 3 (The terminal may determine the number of downlink cells being considered during monitoring of the PDCCH candidates in the same method. That is, the terminal may calculate the maximum PDCCH detection complexity by multiplying the values of the table 10 or the table 11 by $N^{cap}$. The above-described methods may be applied to the case where the number $N^{cap}$ of downlink cells described in the disclosure is determined) in all.

As an example, if a certain terminal reports that the terminal can perform carrier aggregation for 5 or more serving cells to the base station through UE-NR-Capability, the terminal should also report pdcch-BlindDetectionCA that is a UE capability report for the PDCCH monitoring for the carrier aggregation. In this case, as described above in the embodiments 1 to 3, the number $N^{cap}$ of downlink cells capable of monitoring the PDCCH candidates follows the value of pdcch-BlindDetectionCA that is the UE capability report.

In contrast, if a certain terminal reports that the terminal can perform carrier aggregation for 4 or less serving cells to the base station through UE-NR-Capability, the terminal may omit pdcch-BlindDetectionCA that is the UE capability report for the PDCCH monitoring, and in this case, the number $N^{cap}$ of downlink cells capable of monitoring the PDCCH candidates follows the number of downlink cells configured to the corresponding terminal.

If the terminal is configured to perform the DC operation with respect to the maximum number $N_{DC}$ of downlink cells, the base station configures pdcch-BlindDetectionMCG that is a parameter for an MCG and pdcch-BlindDetectionSCG that is a parameter for an SCG to the terminal. In this case, it is required for the base station to guarantee that the sum of values of the two parameters pdcch-BlindDetectionMCG and pdcch-BlindDetectionSCG is equal to or smaller than the value of pdcch-BlindDetectionCA with respect to the terminal having reported the pdcch-BlindDetectionCA (i.e., the terminal supporting the carrier aggregation or DC for 5 or more downlink cells). Further, if the terminal omits the report for pdcch-BlindDetectionCA (i.e., with respect to the terminal supporting the carrier aggregation or DC for 4 or less downlink cells), it is required for the base station to guarantee that the sum of values of the two parameters pdcch-BlindDetectionMCG and pdcch-BlindDetectionSCG is equal to or smaller than the configured maximum number $N_{DC}$ of DC downlink cells. This is to guarantee the maximum PDCCH detection complexity of the terminal to be equal to or lower than a predetermined level. In this case, the terminal assumes that the number $N^{cap}$ of downlink cells capable of monitoring the PDCCH candidates in the MCG is pdcch-BlindDetectionMCG, and it assumes that the number $N^{cap}$ of downlink cells capable of monitoring the PDCCH candidates in the SCG is pdcch-BlindDetectionSCG.

If the terminal omits the report for pdcch-BlindDetectionCA, and $N_{DCmax}$ is the maximum number of downlink cells that can be configured through both the MCG and the SCG, the values of pdcch-BlindDetectionMCG-UE and pdcch-BlindDetectionSCG-UE may be one of [1, 2, 3]. Further, the sum of the values of pdcch-BlindDetectionMCG-UE and pdcch-BlindDetectionSCG-UE should be equal to or larger than $N_{DCmax}$.

For the NC-JT, it is possible for the base station to allocate a plurality of PDSCHs in the same cell and bandwidth part to the terminal through a plurality of PDCCHs. If the base station determines the restrictions on the maximum number of PDCCH candidates and the maximum number of CCEs using only [condition A], [first restriction], and [second restriction] as described above in a situation where the base station operates the NC-JT and the carrier aggregation or the DC at the same time, the plurality of PDCCHs for the NC-JT should be transmitted within the restrictions on the maximum number of PDCCH candidates and the maximum number of CCEs, such as the plurality of PDCCHs for the carrier aggregation, and thus the degree of freedom of PDCCH transmission for the existing carrier aggregation is unable to be maintained.

To solve this, it is possible to introduce "UE capability report for additional PDCCH candidate monitoring" in addition to the UE capability report for the number of downlink cells capable of monitoring the PDCCH candidates, and thus to extend the restrictions on the maximum number of PDCCH candidates and the maximum number of CCEs. The UE capability report for the additional PDCCH candidate monitoring may be notification of whether carrier aggregation, the DC, and separate additional PDCCH candidate monitoring are possible or the degree of the additional PDCCH candidate monitoring through additional signaling, for example, through pdcch-BlindDetectionNCJT signaling of one or more bits in addition to pdcch-BlindDetectionCA, pdcch-BlindDetectionMCG-UE, and pdcch-BlindDetectionSCG-UE that are the UE capability reports for the PDCCH monitoring for the carrier aggregation. The pdcch-BlindDetectionNCJT is an inscription for discriminating the UE capability report or signaling configured by the base station, and it may be replaced by various expressions, such as pdcch-BlindDetectionCoMP and so on, during an actual application thereof, but for convenience in the following explanation, it is standardized as pdcch-BlindDetectionNCJT.

The above explanation means that it is possible to extend the restrictions on the maximum number of PDCCH candidates and the maximum number of CCEs, if needed, even in case that the maximum number of downlink cells configured to the terminal for the CA or the DC is not sufficiently large (e.g., is not larger than $N^{cap}$). Specifically, the base station can extend the restrictions on the maximum number of PDCCH candidates and the maximum number of CCEs through the following methods only with respect to the terminal having performed the UE capability report for the additional PDCCH candidate monitoring among the terminals supporting the NC-JT.

[Method A]

According to [Method A], if corresponding signaling exists (e.g., if pdcch-BlindDetectionNCJT is reported to the base station) through the UE capability report for the additional PDCCH candidate monitoring, the restrictions on the maximum number of PDCCH candidates and the maximum number of CCEs in the related art are increased in a specific ratio (e.g., twice or multiple of the configured number of TRPs, the number of CORESET groups, and the number of PUCCH resource sets/groups). In the present embodiment, it may be understood that the number $N^{cap}$ of downlink cells for the PDCCH candidate monitoring in accordance with respective cases is increased in the specific ratio (e.g., twice). The specific ratio may be one of a predetermined value in accordance with the kind of the UE capability report for the additional PDCCH candidate monitoring and a value indicated through higher layer signaling. It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by numerology/subcarrier spacing (SCS), or separate values are applied by cell groups/cells/bandwidth parts. Hereinafter, an example of a change of restrictions on the maximum number of PDCCH candidates and the maximum number of CCEs by [Method A] will be described.

Case #1 ($\leq N^{cap}$ DL cells+non-DC+non-NCJT): If the terminal is configured with $N^{cap}$ or less downlink cells with respect to possible subcarrier spacing $\mu$=0, 1, 2, 3, and is not configured with an NR-DC operation, and does not report the UE capability report for additional PDCCH candidates monitoring (pdcch-BlindDetectionNCJT-UE) to the base station (or the base station does not configure the additional PDCCH candidate monitoring pdcch-BlindDetectionNCJT), restrictions on the maximum number of PDCCH candidates and the maximum number of CCEs for one downlink cell in one slot follow $M^\mu$ of the table 10 and $C^\mu$ of the table 11.

Case #2 ($>N^{cap}$ DL cells+non-DC+non-NCJT): If the terminal is configured with more than $N^{cap}$ downlink cells with respect to possible subcarrier spacing $\mu=0, 1, 2, 3$, and is not configured with an NR-DC operation, and reports the UE capability report pdcch-BlindDetectionCA-UE for PDCCH monitoring for carrier aggregation to the base station, and does not report the UE capability report pdcch-BlindDetectionNCJT-UE for additional PDCCH candidate monitoring to the base station (or the base station does not configure the additional PDCCH candidate monitoring pdcch-BlindDetectionNCJT), restrictions on the maximum number of PDCCH candidates and the maximum number of CCEs in one slot follow the mathematical expression 1 and the mathematical expression 2. This is the same as the case where the number $N^{cap}$ of downlink cells capable of monitoring the PDCCH candidates follows the value of pdcch-BlindDetectionCA that is the UE capability report.

Case #3 ($\leq N^{cap}$ DL cells+non-DC+NCJT): If the terminal is configured with $N^{cap}$ or less downlink cells with respect to possible subcarrier spacing $\mu=0, 1, 2, 3$, and is not configured with an NR-DC operation, and reports the UE capability report for additional PDCCH candidate monitoring (pdcch-BlindDetectionNCJT-UE) to the base station (or the base station configures the additional PDCCH candidate monitoring (pdcch-BlindDetectionNCJT)), restrictions on the maximum number of PDCCH candidates and the maximum number of CCEs for one downlink cell in one slot follow X times (e.g., X=2) $M^\mu$ of the table 10 and $C^\mu$ of the table 11.

This means that the values of $M^\mu$ or $C^\mu$ that are the restrictions on the maximum number of PDCCH candidates and the maximum number of CCEs for each cell in min($M^\mu$, $M^{total,\mu}$) and min($C^\mu$, $C^{total,\mu}$) of the second restriction can be increased to be equal to or larger than the values of the tables 10 and 11 by the base station configuration or the UE capability report. In this case, the terminal may consider a smaller one of value A (product of the X, the configured number of downlink cells, and $M^\mu$ of the table 10 or $C^\mu$ of the table 11) and value B (value of $4*M^\mu$ or $4*C^\mu$) as the restriction of the maximum number of PDCCH candidates and the maximum number of CCEs. This is to guarantee that additional PDCCH candidate monitoring for the NC-JT is performed within the maximum PDCCH detection complexity for performing the CA.

Case #4 ($>N^{cap}$ DL cells+non-DC+NCJT): If the terminal is configured with more than $N^{cap}$ downlink cells with respect to possible subcarrier spacing $\mu=0, 1, 2, 3$, and is not configured with an NR-DC operation, and reports the UE capability report pdcch-BlindDetectionCA for PDCCH monitoring for carrier aggregation to the base station, and reports the UE capability report for additional PDCCH candidate monitoring (pdcch-BlindDetectionNCJT-UE) to the base station (or the base station configures the additional PDCCH candidate monitoring pdcch-BlindDetectionNCJT), restrictions on the maximum number of PDCCH candidates and the maximum number of CCEs in one slot follow X times (e.g., X=2) the mathematical expression 1 and the mathematical expression 2. This may be understood that $N^{cap}$ is multiplied by X (e.g., X=2) to be applied in the mathematical expression 1 and the mathematical expression 2.

Case #5 ($\leq N^{cap}$ DL cells+DC+non-NCJT): If the terminal is configured with an NR-DC operation, and is configured with $N^{cap}$ or less downlink cells with respect to possible subcarrier spacing $\mu=0, 1, 2, 3$ in the corresponding MCG or SCG, and does not report the UE capability report UE capability report for additional PDCCH candidate monitoring (pdcch-BlindDetectionNCJT-UE) to the base station (or the base station does not configure the additional PDCCH candidate monitoring pdcch-BlindDetectionNCJT), restrictions on the maximum number of PDCCH candidates and the maximum number of CCEs for one downlink cell in one slot follow $M^\mu$ of the table 10 and $C^\mu$ of the table 11. In this case, as described above, the $N^{cap}$ is determined by pdcch-BlindDetectionMCG or pdcch-BlindDetectionSCG.

Case #6 ($>N^{cap}$ DL cells+DC+non-NCJT): If the terminal is configured with an NR-DC operation, and is configured with more than $N^{cap}$ downlink cells with respect to possible subcarrier spacing $\mu=0, 1, 2, 3$ in the corresponding MCG or SCG, and does not report the UE capability report pdcch-BlindDetectionNCJT-UE for additional PDCCH candidate monitoring to the base station (or the base station does not configure the additional PDCCH candidate monitoring pdcch-BlindDetectionNCJT), restrictions on the maximum number of PDCCH candidates and the maximum number of CCEs in one slot follow the mathematical expression 1 and the mathematical expression 2. In this case, as described above, the $N^{cap}$ is determined by pdcch-BlindDetectionMCG or pdcch-BlindDetectionSCG.

Case #7 ($\leq N^{cap}$ DL cells+DC+NCJT): If the terminal is configured with an NR-DC operation, and is configured with Ncap or less downlink cells with respect to possible subcarrier spacing $\mu=0, 1, 2, 3$ in the corresponding MCG or SCG, and reports the UE capability report for additional PDCCH candidate monitoring (pdcch-BlindDetectionNCJT-UE) to the base station (or the base station configures the additional PDCCH candidate monitoring (pdcch-BlindDetectionNCJT), restrictions on the maximum number of PDCCH candidates and the maximum number of CCEs for one downlink cell in one slot follow X times (e.g., X=2) $M^\mu$ of the table 10 and $C^\mu$ of the table 11.

This means that the values of $M^\mu$ or $C^\mu$ that are the restrictions on the maximum number of PDCCH candidates and the maximum number of CCEs for each cell in min($M^\mu$, $M^{total,\mu}$) and min($C^\mu$, $C^{total,\mu}$) of the second restriction can be increased to be equal to or larger than the values of the tables 10 and 11 by the base station configuration or the UE capability report. In this case, the terminal may consider a smaller one of value A (product of the X, the configured number of downlink cells, and $M^\mu$ of the table 10 or $C^\mu$ of the table 11) and value B (value of $4*M^\mu$ or $4*C^\mu$) as the restriction of the maximum number of PDCCH candidates and the maximum number of CCEs. This is to guarantee that additional PDCCH candidate monitoring for the NC-JT is performed within the maximum PDCCH detection complexity for performing the DC. In this case, as described above, the $N^{cap}$ is determined by pdcch-BlindDetectionMCG or pdcch-BlindDetectionSCG.

Case #8 ($>N^{cap}$ DL cells+DC+NCJT): If the terminal is configured with an NR-DC operation, and is configured with more than $N^{cap}$ downlink cells with respect to possible subcarrier spacing $\mu=0, 1, 2, 3$ in the corresponding MCG or SCG, and reports the UE capability report for additional PDCCH candidate monitoring (pdcch-BlindDetectionNCJT-UE) to the base station for additional PDCCH candidate monitoring to the base station (or the base station configures the additional PDCCH candidate monitoring pdcch-Blind-DetectionNCJT), restrictions on the maximum number of PDCCH candidates and the maximum number of CCEs in one slot follow X times (e.g., X=2) the mathematical expression 1 and the mathematical expression 2. This may be understood that $N^{cap}$ is multiplied by X (e.g., X=2) to be applied in the mathematical expression 1 and the mathematical expression 2. This means that the values of $M^\mu$ or $C^\mu$ that are the restrictions on the maximum number of PDCCH candidates and the maximum number of CCEs for each cell in $\min(M^\mu, M^{total,\mu})$ and $\min(C^\mu, C^{total,\mu})$ of the second restriction can be increased to be equal to or larger than the values of the tables 10 and 11 by the base station configuration or the UE capability report. In this case, as described above, the $N^{cap}$ is determined by pdcch-BlindDetection-MCG or pdcch-BlindDetectionSCG.

In addition to the above-described example, various modifications are possible, but are not enumerated herein in order to avoid obscuring of the gist of the explanation.

[Method B]

According to [Method B], if corresponding signaling exists (e.g., if pdcch-BlindDetectionNCJT is reported to the base station), the condition to control the restrictions on the maximum number of PDCCH candidates and the maximum number of CCEs in the related art is extended through the UE capability report for the additional PDCCH candidate monitoring. It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by numerology/subcarrier spacing (SCS), or separate values are applied by cell groups/cells/bandwidth parts. As an example, if at least one condition is satisfied between condition 1) on which the terminal is configured with more than $N^{cap}$ downlink cells with respect to possible subcarrier spacing $\mu=0, 1, 2, 3$, and condition 2) on which the terminal reports the UE capability report pdcch-BlindDetectionNCJT for additional PDCCH candidate monitoring to the base station, it is possible to engage for the extension of the restrictions on the maximum number of PDCCH candidates and the maximum number of CCEs of the terminal. This is to guarantee that the terminals that should detect a plurality of pieces of DCI in one cell for the NC-JT operation can perform the additional PDCCH candidate monitoring even if the configured number of downlink cells is smaller than $N^C$W. An example of a change of the restrictions on the maximum number of PDCCH candidates and the maximum number of CCEs by [Method B] will be described.

In addition to the above-described example, various modifications are possible, but are not enumerated herein in order to avoid obscuring of the gist of the explanation.

[Method C]

According to [Method C], if corresponding signaling exists (e.g., if pdcch-BlindDetectionNCJT is reported to the base station), the definition of the number of downlink cells configured to the terminal in the related art is changed through the UE capability report for the additional PDCCH candidate monitoring. It is possible to engage for the UE capability report for the additional PDCCH candidate monitoring so that a single value is applied to all the cells, or separate values are applied by frequency bands (e.g., frequency range 1 equal to or lower than 6 GHz versus frequency range 2 higher than 6 GHz), or separate values are applied by numerologies/subcarrier spacing (SCS), or separate values are applied by cell groups/cells/bandwidth parts. This is to guarantee that the terminals that should detect a plurality of pieces of DCI in one cell for the NC-JT operation can perform the additional PDCCH candidate monitoring even if the configured number of downlink cells is smaller than $N^{cap}$.

As an example, if the UE capability report for the additional PDCCH candidate monitoring or signaling on whether to apply the NC-JT is applied to all the cells, the terminal multiplies the configured number of downlink cells by the number of PDSCHs for the NC-JT (or the number of codewords or a value that is signaled or reported by the terminal), and if the value is larger than a specific value (e.g., if the NR-DC operation is not configured, the value is 4, whereas if the NR-DC operation is configured, the value is $N^{cap}$), it is possible to engage for the extension of the restrictions on the maximum number of PDCCH candidates and the maximum number of CCEs.

As another example, if the UE capability report (e.g., pdcch-BlindDetectionNCJT-UE) for the additional candidate monitoring or signaling on whether to apply the NC-JT configured by the base station (e.g., pdcch-BlindDetection-NCJT) is reported and applied by downlink cells, the terminal may count a number of a downlink cells to which the NC-JT is applied as X when calculating the configured number of the corresponding cells. Here, X may be various values, such as the configured number of TRPs, the number of CORESET groups, or the number of PUCCH resource sets/groups.

For example, if the terminal is configured with 3 downlink cells in total, and additional PDCCH candidate monitoring for the NC-JT is applied to 2 of the 3 downlink cells and the additional PDCCH candidate monitoring is not applied to one remaining cell, it may be assumed that the terminal counts 4 by multiplying the 2 cells by 2, and counts 1

---

Case #1: If the terminal is configured with $N^{cap}$ or less downlink cells with respect to possible subcarrier spacing $\mu = 0, 1, 2, 3$, and does not report the UE capability report pdcch-BlindDetectionNCIT for additional PDCCH candidate monitoring to the base station, restrictions on the maximum number of PDCCH candidates and the maximum number of CCEs for one downlink cell in one slot follow $M^\mu$ of the table 10 and $C^\mu$ of the table 11.

Case #2: If the terminal is configured with more than $N^{cap}$ downlink cells with respect to possible subcarrier spacing $\mu = 0, 1, 2, 3$, or the terminal reports the UE capability report pdcch-BlindDetectionNCIT for additional PDCCH candidate monitoring to the base station, restrictions on the maximum number of PDCCH candidates and the maximum number of CCEs follow mathematical expression 10 and mathematical expression 11 below.

[Mathematical expression 10]

$M^{total,\mu} = \lfloor N^{cap} \cdot M^\mu \cdot N^\mu / N^{total} \rfloor$

[Mathematical expression 11]

$M^{total,\mu} = \lfloor N^{cap} \cdot C^\mu \cdot N^\mu / N^{total} \rfloor$ without multiplying the one cell by 2 to configure total 5 downlink cells. This may be understood that the configured number $N^\mu$ or $N^{total}$ of downlink cells as described above is calculated, and $N^\mu$ is multiplied by a coefficient $X_i$ in a comparison process with the value $N^{cap}$. As an example, i may be one of a serving cell ID, SCS, BWP ID, cell group ID, CORESET ID, CORESET group ID, and PUCCH resource/set/group ID. It is possible to insert IDs of the serving cell ID, SCS, BWP ID, cell group ID, and CORESET group ID in the mathematical expressions 1 to 11 in order to indicate whether to apply the additional PDCCH candidate monitoring with respect to the group represented by the corresponding IDs. As an example, if it is assumed that i is a cell ID, $X_i$ becomes 1 with respect to the cell to which the additional PDCCH candidate monitoring is not applied, whereas it becomes a value that is larger than 1 (e.g., 2) with respect to the cell to which the additional PDCCH candidate monitoring is applied, so that it can exert an influence on the determination of the value of $M^{total}$ or $C^{total}$ in the mathematical expressions 1 to 11.

According to the present embodiment, it is possible to change or/and extend the second restriction as follows. UE capability report signaling on whether the additional PDCCH candidate monitoring is possible is called pdcch-BlindDetectionNCJT-UE, and signaling on whether to apply the additional PDCCH candidate monitoring configured by the base station is called pdcch-BlindDetectionNCJT. Based on $M^\mu$ of the table 10 and $C^\mu$ of the table 11, the terminal is not required to monitor PDCCH candidates the number of which is larger than $\min(X_i*M^\mu, M^{total,\mu})$ (or $\min(X_i+M^\mu, M^{total,\mu})$) or to monitor CCEs the number of which is larger than $\min(X_i*C^\mu, C^{total,\mu})$ (or $\min(X_i+C^\mu, C^{total,\mu})$) with respect to activated bandwidth parts configured with the subcarrier spacing p in the individually scheduled cells. In this case, values of $M^{total,\mu}$ and $C^{total,\mu}$ may be increased in accordance with pdcch-BlindDetectionNCJT configured by the base station, and values of $X_i*M^\mu$ and $X_i*C^\mu$ (or $X_i+M^\mu$ and $X_i+C^\mu$) may be restricted/increased in accordance with the UE capability report signaling pdcch-BlindDetectionNCJT-UE. This is called a corrected second restriction. That is, the corrected second restriction may call a change of the maximum PDCCH candidates and the maximum number of CCEs that can be applied to a specific cell configured with the subcarrier spacing p in accordance with the UE capability report or base station configuration.

In configuring a search space set for a specific cell PCell, the base station may notify the terminal of configurations including PDCCH candidates or CCEs the number of which is larger than $M^\mu$ of the table 10 and $C^\mu$ of the table 11 which do not satisfy the above-described condition A. If the search space of the specific cell exceeds the corrected second restriction when the terminal monitors the search space of the specific cell at a specific time in accordance with the search space configuration of the base station, the terminal may selectively monitor a specific search space set in the procedure of the [Method 1] as described above.

Table 16 below presents an example of a change of the restrictions on the maximum number of PDCCH candidates and the maximum number of CCEs by [Method C].

TABLE 16

If the terminal is configured with $N^{cap}$ or less downlink cells with respect to possible subcarrier spacing µ = 0, 1, 2, 3, restrictions on the maximum number of PDCCH candidates and the maximum number of CCEs in one slot and in one downlink cell follow $M^\mu$ of the table 10 and $C^\mu$ of the table 11.

If a condition $\sum_{\mu=0}^{3} X \cdot N^\mu \leq N^{cap}$ (e.g., $X > 1$, here, it is possible that $X$ has a different value for each µ or for each cell) is satisfied by the number of downlink cells with which the terminal is configured with respect to possible subcarrier spacing µ = 0, 1, 2, 3 and the UE capability report pdcch-BlindDetectionNCJT for the additional PDCCH candidate monitoring, restrictions on the maximum number of PDCCH candidates and the maximum number of CCEs in one slot and in one downlink cell follow $M^\mu$ of the table 10 and $C^\mu$ of the table 11.

If the terminal is configured with more than $N^{cap}$ downlink cells with respect to possible subcarrier spacing µ = 0, 1, 2, 3, or reports the UE capability report pdcch-BlindDetectionNCJT for additional PDCCH candidate monitoring to the base station, restrictions on the maximum number of PDCCH candidates and the maximum number of CCEs in one slot follow mathematical expression 10 and mathematical expression 11.

If a condition $\sum_{\mu=0}^{3} X \cdot N^\mu > N^{cap}$ (e.g., $X > 1$, here, it is possible that $X$ has a different value for each µ or for each cell) is satisfied by the number of downlink cells with which the terminal is configured with respect to possible subcarrier spacing µ = 0, 1, 2, 3 and the UE capability report pdcch-BlindDetectionNCJT for the additional PDCCH candidate monitoring, restrictions on the maximum number of PDCCH candidates and the maximum number of CCEs follow the mathematical expression 10 and the mathematical expression 11.

In addition to the table 16, various modifications are possible, but are not enumerated herein in order to avoid obscuring of the gist of the explanation.

It is possible to differently apply the restrictions on the maximum number of PDCCH candidates and the maximum number of CCEs by [Method A] to [Method C] by frequency bands (e.g., frequency range 1 equal to or lower than 6 GHz versus frequency range 2 higher than 6 GHz).

In the present embodiment, [Method A] to [Method C] are not exclusive to each other, but can be combined and applied together. For example, [Method C] may be applied in consideration of the mathematical expressions 3 and 4 in [Method A].

Hereinafter, for convenience in explanation, the restriction on the maximum number of PDCCH candidates and the maximum number of CCEs by [Method A] to [Method C] may be called a third restriction.

Figure 13:
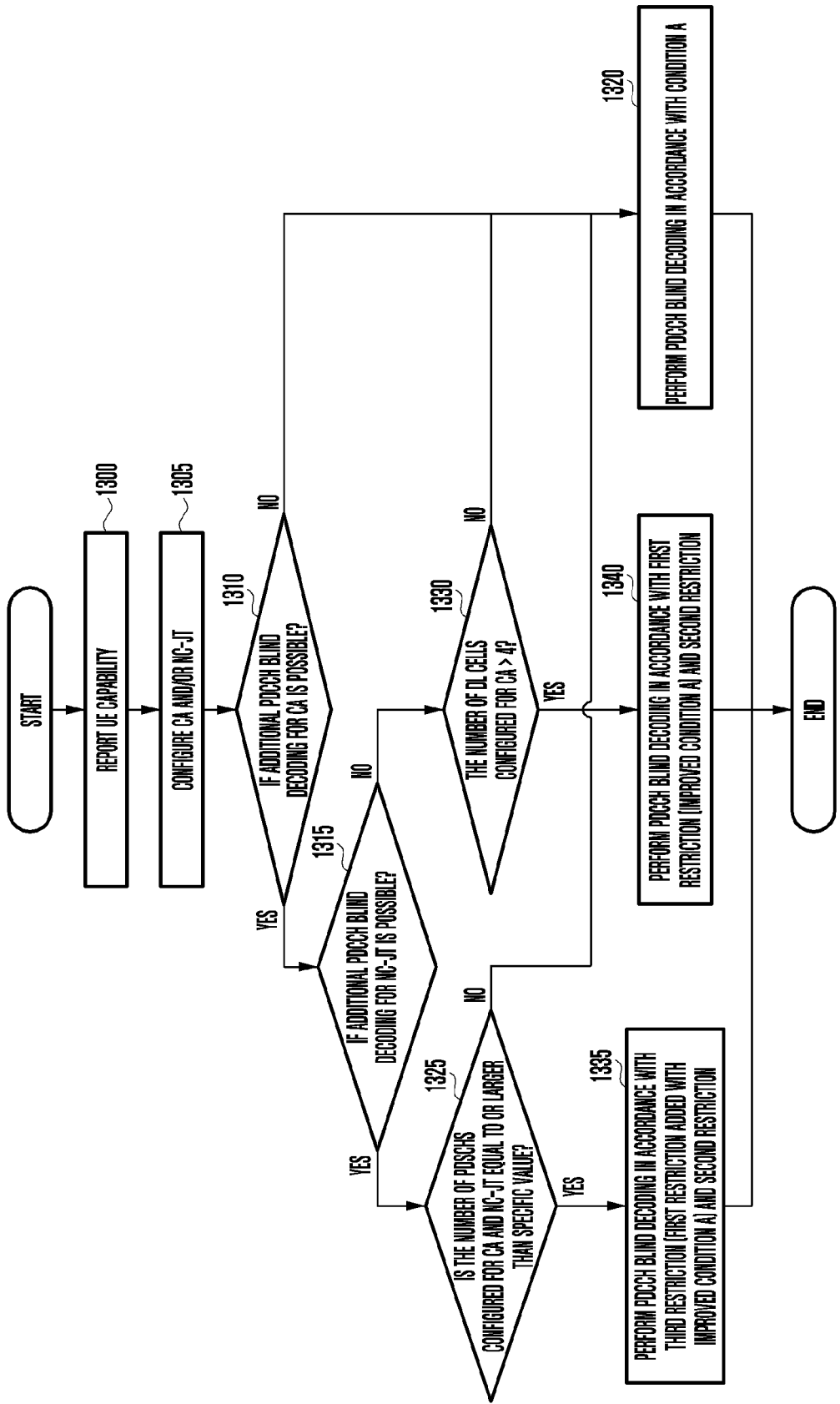
FIG. 13 illustrates a diagram of a block diagram illustrating an operation of a terminal for determining restrictions on the maximum number of PDCCH candidates and the maximum number of CCEs according to some embodiments of the disclosure.

FIG. 13 illustrates a diagram of an operation of a terminal to determine restrictions on the maximum number of PDCCH candidates and the maximum number of CCEs according to an embodiment of the disclosure. At operation 1300, with respect to a base station, the terminal performs a UE capability report (e.g. pdcch-BlindDetectionCA) for PDCCH monitoring for carrier aggregation and a UE capability report (e.g. pdcch-BlindDetectionNCJT) notifying whether additional PDCCH candidate monitoring is possible and the degree of the additional PDCCH candidate monitoring. At operation 1305, the base station performs higher layer configurations for downlink cells for carrier aggregation, whether an NC-JT transmission is possible, or whether multi-PDCCH based NC-JT transmission is possible based on the UE capability reports. Thereafter, the base station and the terminal determine whether additional PDCCH blind decoding for CA is possible by the UE capability report and subsequent higher layer configuration values (1310).

If the additional PDCCH blind decoding is not possible, the terminal performs PDCCH blind decoding in accordance with the [condition A] (1320). In contrast, if the additional PDCCH blind decoding is possible, the terminal additionally determines whether additional PDCCH blind decoding for an NC-JT is possible (1315), and if the additional PDCCH blind decoding for the NC-JT is not possible, the terminal determines whether the number of downlink cells configured for the carrier aggregation is larger than 4 (1330). In accordance with the result of the determination, the terminal may perform PDCCH decoding without changing restrictions on the maximum number of PDCCH candidates and the maximum number of CCEs (1320), or the terminal may perform the PDCCH decoding by increasing the restrictions on the maximum number of PDCCH candidates and the maximum number of CCEs, that is, in accordance with a first restriction and a second restriction (1340).

If the terminal determines that the additional PDCCH blind decoding for the NC-JT is possible, the terminal may additionally determine whether the third restriction is applicable in accordance with the above-described method (e.g., depending on whether the maximum number of PDSCHs configured for the CA and NC-JT is equal to or larger than a specific value (1335), and in accordance with the result of the determination, the terminal may perform the PDCCH decoding without changing the restrictions on the maximum number of PDCCH candidates and the maximum number of CCEs (1320), or the terminal may perform the PDCCH decoding in accordance with the third restriction and the second restriction by additionally increasing the restrictions on the maximum number of PDCCH candidates and the maximum number of CCEs (1335).

Further, the contents of FIG. 13 are applied to the base station, and the base station may determine the restrictions on the maximum number of PDCCH candidates and the maximum number of CCEs of the terminal in accordance with the contents of FIG. 13.

As described above, for the NC-JT operation, the base station may assign two or more PDSCHs to the same terminal in the same cell and in the same bandwidth part in a manner that it selects one of 1) transmission of a plurality of PDCCHs allocating different PDSCHs and 2) allocation of a plurality of PDSCHs on one PDCCH. In this case, if the base station selects the second method, that is, allocation of the plurality of PDSCHs on one PDCCH, the number of PDCCHs is not increased even if the NC-JT operation is performed, and thus it is possible not to apply the methods for increasing the PDCCH candidate monitoring as described above in the above examples.

If the allocation of the plurality of PDSCHs on one PDCCH is selected, it is to be noted that two or more TCI states are configured/allocated/activated at one TCI code point, and thus it is possible for the terminal to engage for non-performing of the multi-DCI NC-JT PDCCH blind decoding operation or the multi-DCI NC-JT PDSCH reception operation in case that two or more TCI states are configured, allocated, or activated at one TCI code point. Through this, it is possible to avoid unnecessary PDCCH detection complexity improvement of the terminal.

In the above-described embodiments, the methods for increasing the maximum number of PDCCH candidate BDs/CCEs in one cell in accordance with the NC-JT application, but it is not necessary to restrict the usage of the methods depending on whether to apply the NC-JT. For example, in case of the terminals simultaneously supporting various verticals, such as eMBB, URLLC, and so on, it is necessary to increase the degree of freedom of PDCCH transmission by increasing the additional PDCCH candidate and CCE detection complexity at the specific time, and for this, the above-described embodiments can be properly adopted.

Figure 14:
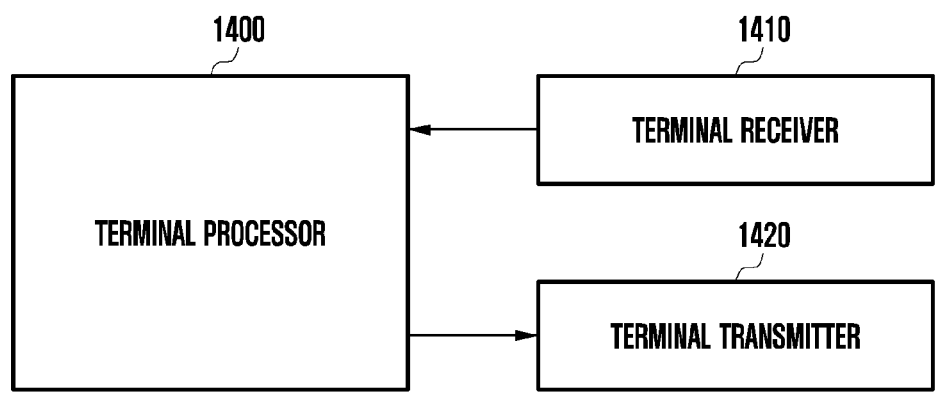
FIG. 14 illustrates a block diagram of the internal structure of a terminal according to an embodiment of the disclosure.
Figure 15:
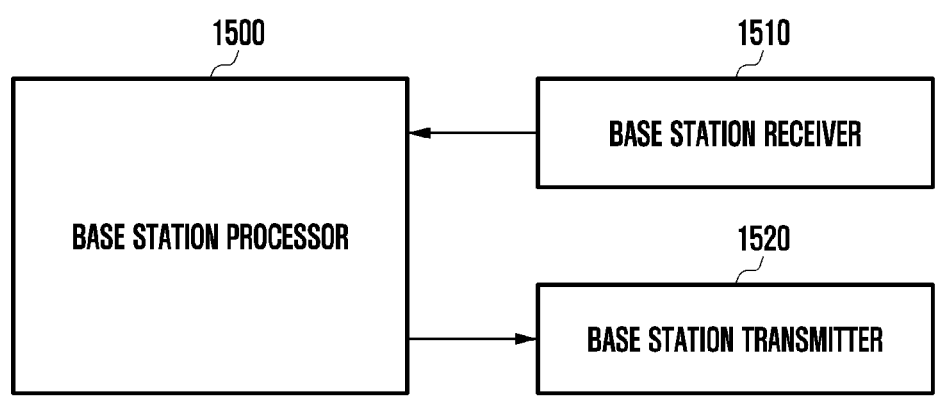
FIG. 15 illustrates a diagram of the internal structure of a base station according to an embodiment of the disclosure.

In order to perform the above-described embodiments of the disclosure, transmitters, receivers, and processors of a terminal and a base station are illustrated in FIGS. 14 and 15. In the 5G communication system corresponding to the above-described embodiments, the transmission and reception method of the base station and the terminal for adopting the method for transmitting and receiving the downlink control channel and the downlink control information has been described, and in order to perform this, the transmitters, receivers, and processors of the base station and the terminal should operate in accordance with the respective embodiments.

Specifically, FIG. 14 illustrates a block diagram of the internal configuration of a terminal according to an embodiment of the disclosure. As illustrated in FIG. 14, a terminal according to the disclosure may include a terminal processor 1400, a receiver 1410, and a transmitter 1420.

The terminal processor 1400 may control a series of processes in which the terminal can operate according to an embodiment of the disclosure. For example, the terminal processor 1400 may differently control the method for calculating the restrictions on the maximum number of PDCCH candidates and the maximum number of CCEs and the PDCCH monitoring operation of the terminal according to an embodiment of the disclosure. In an embodiment of the disclosure, the terminal receiver 1410 and the terminal transmitter 1420 may be commonly called a transceiver. The transceiver may transmit/receive a signal to/from a base station. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver of the terminal may receive the signal through a radio channel, output the signal to the terminal processor 1400, and transmit the signal output from the terminal processor 1400 through the radio channel.

FIG. 15 illustrates a block diagram of the internal configuration of a base station according to the embodiments of the disclosure. As illustrated in FIG. 15, a base station according to the disclosure may include a base station processor 1500, a receiver 1510, and a transmitter 1520.

The base station processor 1500 may control a series of processes in which the base station can operate according to an embodiment of the disclosure. For example, the base station processor 1500 may differently control the method for calculating the restrictions on the maximum number of PDCCH candidates and the maximum number of CCEs and the control resource set and search space configuration operation of the base station. In an embodiment of the disclosure, the base station receiver 1510 and the base station transmitter 1520 may be commonly called a transceiver. The transceiver may transmit/receive a signal to/from a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station processor 1500, and transmit the signal output from the base station processor 1500 through the radio channel.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure in addition to the embodiments disclosed herein. Further, if needed, the respective embodiments may be combined and operated with each other.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
identifying a number of cells associated with a capability to monitor physical downlink control channel (PDCCH) candidates based on a number of cells in a first set and a product of a number of cells in a second set and a coefficient;
determining a maximum number of PDCCH candidates for each cell based on the number of cells associated with the capability to monitor PDCCH candidates;
identifying search spaces to monitor based on the maximum number of PDCCH candidates; and
monitoring a PDCCH on the identified search space.

2. The method of claim 1, wherein the maximum number of PDCCH candidates is determined based on whether the number of cells associated with the capability to monitor PDCCH candidates is equal to or less than a number of configured cells which is determined based on a control resource set (CORESET) group identifier configured to each cell or not.

3. The method of claim 2, wherein in case that the number of cells associated with the capability to monitor PDCCH candidates is equal to or less than the number of configured cells, the maximum number of PDCCH candidates for a cell is determined as a preconfigured maximum number of monitored PDCCH candidates corresponding to a subcarrier spacing of the cell or a multiple of the preconfigured number of monitored PDCCH candidates corresponding to a subcarrier spacing of the cell based on the CORESET group identifier configured to the cell.

4. The method of claim 2, wherein in case that the number of cells is not equal to or less than the number of configured cells, the maximum number of PDCCH candidates for a cell is determined based on a number $M^{total,\mu}$ corresponding to following equation:

$$M^{total,\mu} = \lfloor N^{cap} \times M^{\mu} \times N^{\mu}/N^{total} \rfloor,$$

where $N^{cap}$ is the number of cells associated with the capability to monitor PDCCH candidates, $M^{\mu}$ is a preconfigured maximum number of monitored PDCCH candidates corresponding to a subcarrier spacing of the cell $\mu$, $N^{\mu}$ is a number of at least one configured cells corresponding to the subcarrier spacing of the cell $\mu$ determined based on the CORESET group identifier configured to the cell, and $N^{total}$ is the number of configured cells.

5. The method of claim 1, wherein the coefficient is associated with a CORESET group identifier configured to each of the cell in the second set.

6. The method of claim 5, wherein the identifying the search spaces comprises:
selecting a search space to monitor which corresponds to CORESETs of a first CORESET group identifier (ID) in case that it is needed to select the search space to monitor in a primary cell.

7. A method performed by a base station in a communication system, the method comprising:
identifying a number of cells associated with a capability to monitor physical downlink control channel (PDCCH) candidates of a terminal based on a number of cells in a first set and a product of a number of cells in a second set and a coefficient;
determining a maximum number of PDCCH candidates for each cell based on the number of cells associated with the capability to monitor PDCCH candidates;
identifying search spaces to be monitored by the terminal based on the maximum number of PDCCH candidates; and
transmitting downlink control information on the identified search space of a PDCCH.

8. The method of claim 7, wherein the maximum number of PDCCH candidates is determined based on whether the number of cells associated with the capability to monitor PDCCH candidates is equal to or less than a second number of configured cells which is determined based on a control resource set (CORESET) group identifier configured to each cell or not.

9. The method of claim 8, wherein in case that the number of cells associated with the capability to monitor PDCCH candidates is equal to or less than the second number of configured cells, the maximum number of PDCCH candidates for a cell is determined as a preconfigured maximum number of monitored PDCCH candidates corresponding to a subcarrier spacing of the cell or a multiple of the preconfigured maximum number of monitored PDCCH candidates corresponding to a subcarrier spacing of the cell based on the CORESET group identifier configured to the cell.

10. The method of claim 8, wherein in case that the number of cells associated with the capability to monitor PDCCH candidates is not equal to or less than the number of configured cells, the maximum number of PDCCH candidates for a cell is determined based on a number $M^{total,\mu}$ corresponding to following equation:

$$M^{total,\mu} = \lfloor N^{cap} \times M^{\mu} \times N^{\mu}/N^{total} \rfloor,$$

where $N^{cap}$ is the number of cells associated with the capability to monitor PDCCH candidates, $M^{\mu}$ is a preconfigured maximum number of monitored PDCCH candidates corresponding to a subcarrier spacing of the cell $\mu$, $N^{\mu}$ is a number of at least one configured cells corresponding to the subcarrier spacing of the cell $\mu$ determined based on the CORESET group identifier configured to the cell, and $N^{total}$ is the second number of configured cells.

11. The method of claim 7, wherein the coefficient is associated with a CORESET group identifier configured to each of the cell in the second set.

12. The method of claim 11, wherein the identifying the search spaces comprises:
  selecting a search space to be monitored which corresponds to CORESETs of a first CORESET group identifier (ID) in case that it is needed to select the search space to monitor in a primary cell.

13. A terminal in a communication system, the terminal comprising:
  a transceiver; and
  a controller coupled with the transceiver and configured to:
    identify a number of cells associated with a capability to monitor physical downlink control channel (PDCCH) candidates based on a number of cells in a first set and a product of a number of cells in a second set and a coefficient,
    determine a maximum number of PDCCH candidates for each cell based on the number of cells associated with the capability to monitor PDCCH candidates,
    identify search spaces to monitor based on the maximum number of PDCCH candidates, and
    perform monitoring a PDCCH on the identified search space.

14. The terminal of claim 13, wherein the maximum number of PDCCH candidates is determined based on whether the number of cells associated with the capability to monitor PDCCH candidates is equal to or less than a number of configured cells which is determined based on a control resource set (CORESET) group identifier configured to each cell or not.

15. The terminal of claim 14, wherein in case that the number of cells associated with the capability to monitor PDCCH candidates is equal to or less than the number of configured cells, the maximum number of PDCCH candidates for a cell is determined as a preconfigured maximum number of monitored PDCCH candidates corresponding to a subcarrier spacing of the cell or a multiple of the preconfigured maximum number of monitored PDCCH candidates corresponding to a subcarrier spacing of the cell based on the CORESET group identifier configured to the cell.

16. The terminal of claim 14, wherein in case that the number of cells associated with the capability to monitor PDCCH candidates is not equal to or less than the number of configured cells, the maximum number of PDCCH candidates for a cell is determined based on a number $M^{total,\mu}$ corresponding to following equation:

$$M^{total,\mu} = \lfloor N^{cap} \times M^{\mu} \times N^{\mu}/N^{total} \rfloor,$$

where $N^{cap}$ is the number of cells associated with the capability to monitor PDCCH candidates, $M^{\mu}$ is a preconfigured maximum number of monitored PDCCH candidates corresponding to a subcarrier spacing of the cell $\mu$, $N^{\mu}$ is a number of at least one configured cells corresponding to the subcarrier spacing of the cell $\mu$ determined based on the CORESET group identifier configured to the cell, and $N^{total}$ is the number of configured cells.

17. The terminal of claim 13, wherein the coefficient is associated with a CORESET group identifier configured to each of the cell in the second set.

18. The terminal of claim 17, wherein to identify the search spaces, the controller is further configured to select a search space to monitor which corresponds to CORESETs of a first CORESET group identifier (ID) in case that it is needed to select the search space to monitor in a primary cell.

19. A base station in a communication system, the base station comprising:
  a transceiver; and
  a controller coupled with the transceiver and configured to:
    identify a number of cells associated with a capability to monitor physical downlink control channel (PDCCH) candidates of a terminal based on a number of cells in a first set and a product of cells in a second set and a coefficient,
    determine a maximum number of PDCCH candidates for each cell based on the number of cells associated with the capability to monitor PDCCH candidates,
    identify search spaces to be monitored by the terminal based on the maximum number of PDCCH candidates, and
    transmit downlink control information on the identified search space of a PDCCH.

20. The base station of claim 19, wherein the maximum number of PDCCH candidates is determined based on whether the number of cells associated with the capability to monitor PDCCH candidates is equal to or less than a number of configured cells which is determined based on a control resource set (CORESET) group identifier configured to each cell or not.

21. The base station of claim 20, wherein in case that the number of cells associated with the capability to monitor PDCCH candidates is equal to or less than the number of configured cells, the maximum number of PDCCH candidates for a cell is determined as a preconfigured maximum number of monitored PDCCH candidates corresponding to a subcarrier spacing of the cell or a multiple of the preconfigured maximum number of monitored PDCCH candidates corresponding to a subcarrier spacing of the cell based on the CORESET group identifier configured to the cell.

22. The base station of claim 20, wherein in case that the number of cells associated with the capability to monitor PDCCH candidates is not equal to or less than the number of configured cells, the maximum number of PDCCH candidates for a cell is determined based on a number $M^{total,\mu}$ corresponding to following equation:

$$M^{total,\mu} = \lfloor N^{cap} \times M^{\mu} \times N^{\mu}/N^{total} \rfloor,$$

where $N^{cap}$ is the number of cells associated with the capability to monitor PDCCH candidates, $M^{\mu}$ is a preconfigured maximum number of monitored PDCCH candidates corresponding to a subcarrier spacing of the cell $\mu$, $N^{\mu}$ is a number of at least one configured cells corresponding to the subcarrier spacing of the cell $\mu$ determined based on the CORESET group identifier configured to the cell, and $N^{total}$ is the number of configured cells.

23. The base station of claim 19, wherein the coefficient is associated with a CORESET group identifier configured to each of the cell in the second set.

24. The base station of claim 23, wherein to identify the search spaces, the controller is further configured to select a search space to be monitored which corresponds to CORESETs of a first CORESET group identifier (ID) in case that it is needed to select the search space to monitor in a primary cell.

* * * * *